United States Patent
Sugioka

(10) Patent No.: US 10,303,419 B2
(45) Date of Patent: May 28, 2019

(54) INFORMATION PROCESSING SYSTEM, DISPLAY PROCESSING APPARATUS, DISPLAY PROCESSING METHOD, AND RECORDING MEDIUM

(71) Applicant: RICOH COMPANY, LTD., Tokyo (JP)

(72) Inventor: Tatsuroh Sugioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/629,849

(22) Filed: Jun. 22, 2017

(65) Prior Publication Data
US 2018/0011679 A1   Jan. 11, 2018

(30) Foreign Application Priority Data

Jul. 6, 2016 (JP) .................................. 2016-134518
May 12, 2017 (JP) .................................. 2017-095303

(51) Int. Cl.
*G06F 3/147*   (2006.01)
*G06F 3/14*   (2006.01)
(Continued)

(52) U.S. Cl.
CPC ............ *G06F 3/1454* (2013.01); *G06F 3/147* (2013.01); *G09G 3/001* (2013.01); *G09G 5/005* (2013.01);
(Continued)

(58) Field of Classification Search
None
See application file for complete search history.

(56) References Cited

U.S. PATENT DOCUMENTS

2007/0257927 A1*  11/2007  Sakanishi ............... G09G 5/005
                                                                 345/581
2008/0158438 A1*  7/2008   Maeda .................... H04N 5/74
                                                                 348/744
(Continued)

FOREIGN PATENT DOCUMENTS

JP         2004-054783         2/2004

OTHER PUBLICATIONS

U.S. Appl. No. 15/419,169 filed Jan. 30, 2017.

*Primary Examiner* — Kyle Zhai
(74) *Attorney, Agent, or Firm* — Oblon, McClelland, Maier & Neustadt, L.L.P.

(57) ABSTRACT

A display processing apparatus connected to a plurality of information processing terminals through a network, displays first image data received from a first information processing terminal of the information processing terminals on a display in a full-screen display mode in response to a switching request, transmits response information that includes non-display information indicating non-display of image data to a second information processing terminal other than the first information processing terminal in the full-screen display mode, and receives an update request from the second information processing terminal in response to the response information, the update request not including second image data to be transmitted from the second information processing terminal and including predetermined information having a data amount smaller than a data amount of the second image data.

16 Claims, 18 Drawing Sheets

(51) Int. Cl.
*G09G 5/00* (2006.01)
*G09G 5/14* (2006.01)
*G09G 3/00* (2006.01)

(52) U.S. Cl.
CPC ............... *G09G 5/006* (2013.01); *G09G 5/14* (2013.01); *G09G 2300/026* (2013.01); *G09G 2340/0407* (2013.01); *G09G 2370/04* (2013.01); *G09G 2370/042* (2013.01); *G09G 2370/16* (2013.01); *G09G 2370/20* (2013.01)

(56) References Cited

U.S. PATENT DOCUMENTS

| | | | |
|---|---|---|---|
| 2010/0302130 A1* | 12/2010 | Kikuchi | G06F 3/0481 345/1.3 |
| 2015/0371603 A1 | 12/2015 | Nagafuchi et al. | |
| 2015/0371682 A1 | 12/2015 | Aoki et al. | |
| 2017/0039691 A1 | 2/2017 | Sugioka | |

* cited by examiner

FIG. 6A

| ENTRY NUMBER | IDENTIFICATION INFORMATION | DISPLAY STATUS | IMAGE SIZE | UPDATE FREQUENCY |
|---|---|---|---|---|
| 1 | Tablet1 | SHARED DISPLAY | 640 × 400 | 5fps |
| 2 | PC1 | SHARED DISPLAY | 640 × 400 | 5fps |
| 3 | Tablet2 | SHARED DISPLAY | 640 × 400 | 5fps |
| 4 | PC3 | SHARED DISPLAY | 640 × 400 | 5fps |

FIG. 6B

| ENTRY NUMBER | IDENTIFICATION INFORMATION | DISPLAY STATUS | IMAGE SIZE | UPDATE FREQUENCY |
|---|---|---|---|---|
| 1 | Tablet1 | FULL-SCREEN DISPLAY | 1280 × 800 | 30fps |
| 2 | PC1 | NON-DISPLAY | 0 × 0 | 5fps |
| 3 | Tablet2 | NON-DISPLAY | 0 × 0 | 5fps |
| 4 | | | | |

| INFORMATION TYPE | GIVEN-INFORMATION SIZE | GIVEN INFORMATION |

| No. | INFORMATION TYPE |
|---|---|
| 01 | NO INFORMATION |
| 02 | TEXT |
| ... | ... |

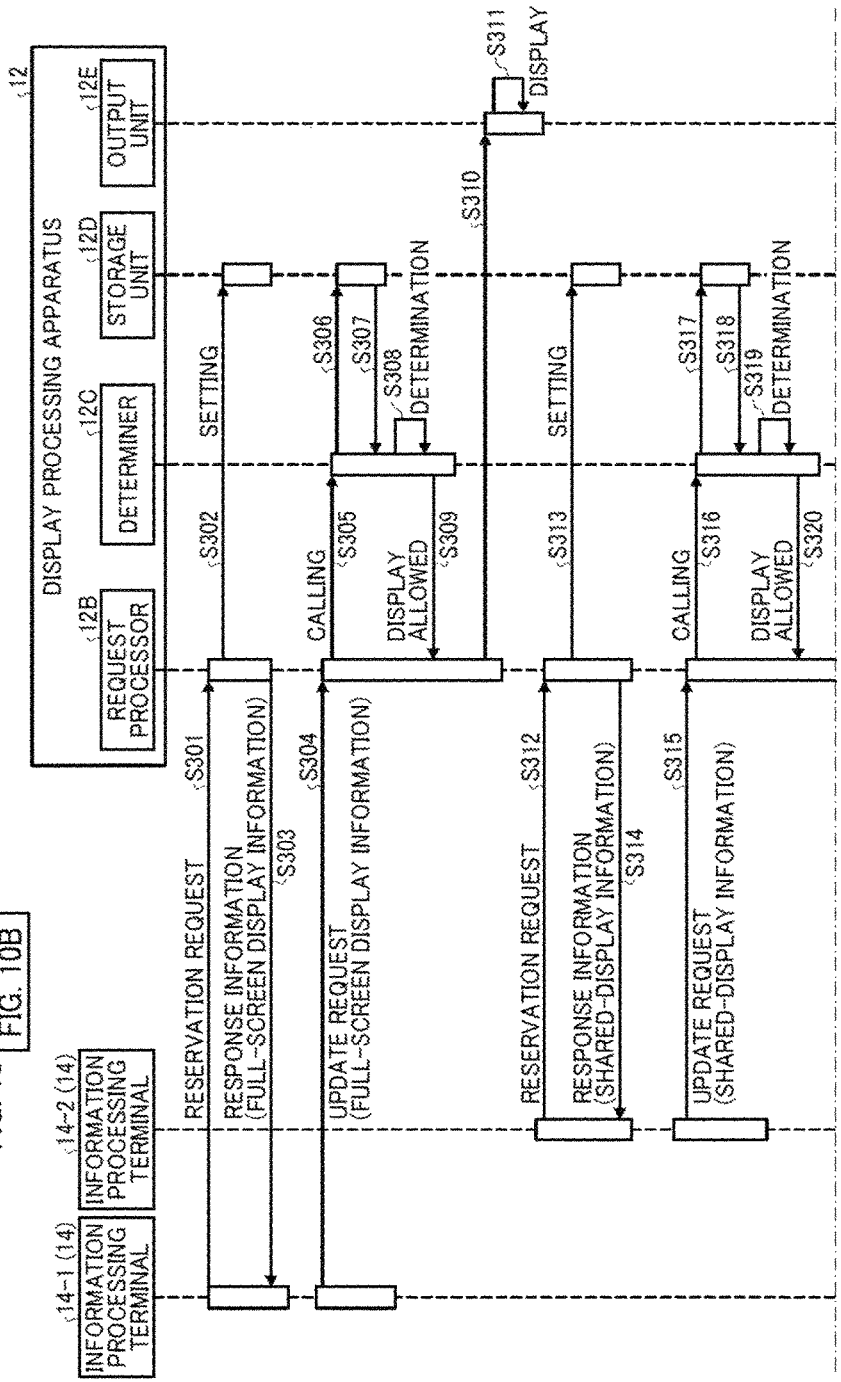

FIG. 11A

| ENTRY NUMBER | IDENTIFICATION INFORMATION | DISPLAY STATUS | IMAGE SIZE | UPDATE FREQUENCY |
|---|---|---|---|---|
| 1 | 001 | FULL-SCREEN DISPLAY | 1280 × 800 | 30fps |
| 2 | | | | |
| 3 | | | | |
| 4 | | | | |

FIG. 11B

| ENTRY NUMBER | IDENTIFICATION INFORMATION | DISPLAY STATUS | IMAGE SIZE | UPDATE FREQUENCY |
|---|---|---|---|---|
| 1 | 001 | SHARED DISPLAY | 640 × 400 | 5fps |
| 2 | 002 | SHARED DISPLAY | 640 × 400 | 5fps |
| 3 | | | | |
| 4 | | | | |

FIG. 11C

| ENTRY NUMBER | IDENTIFICATION INFORMATION | DISPLAY STATUS | IMAGE SIZE | UPDATE FREQUENCY |
|---|---|---|---|---|
| 1 | 001 | FULL-SCREEN DISPLAY | 1280 × 800 | 30fps |
| 2 | 002 | NON-DISPLAY | 0 × 0 | 5fps |
| 3 | | | | |
| 4 | | | | |

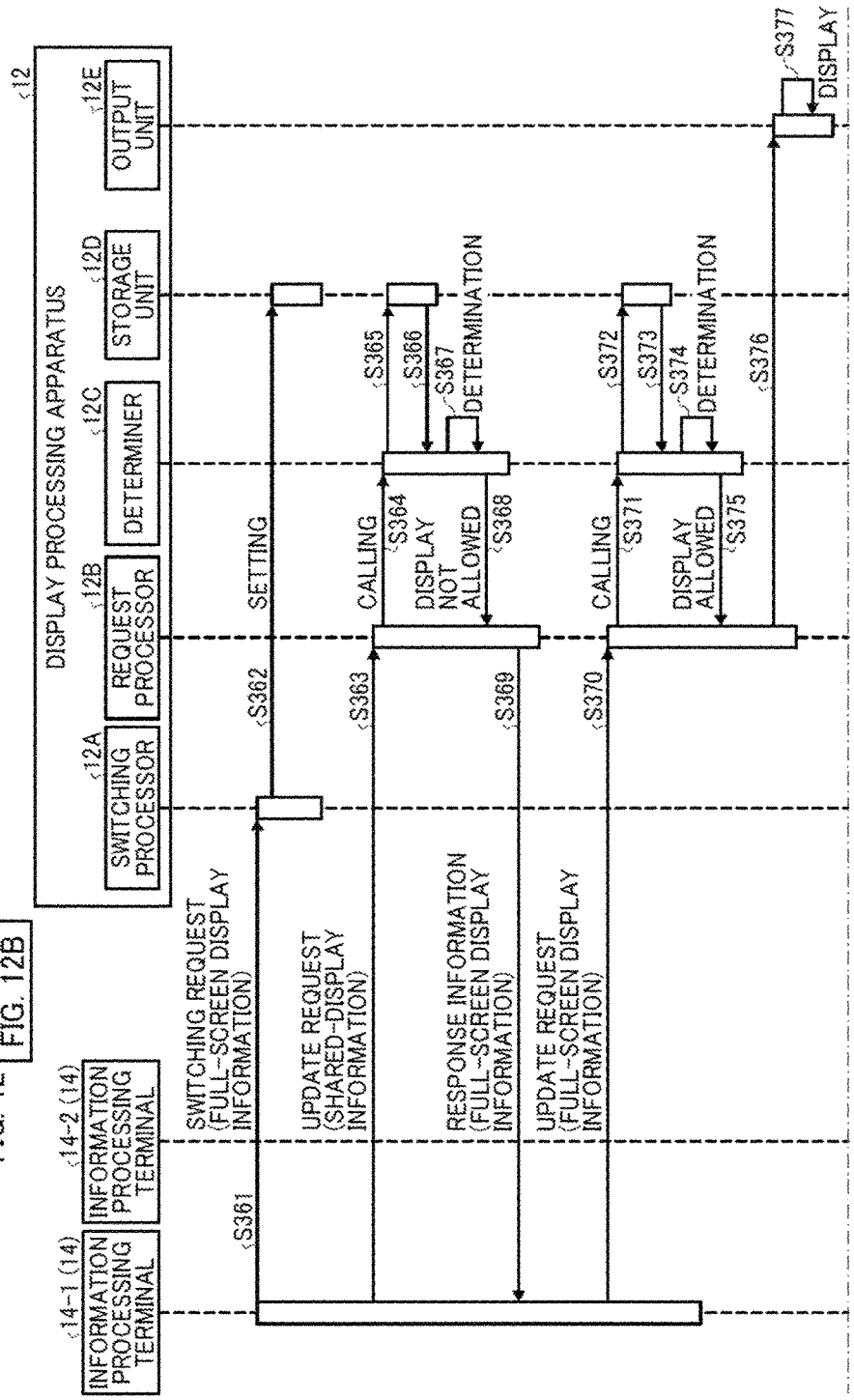

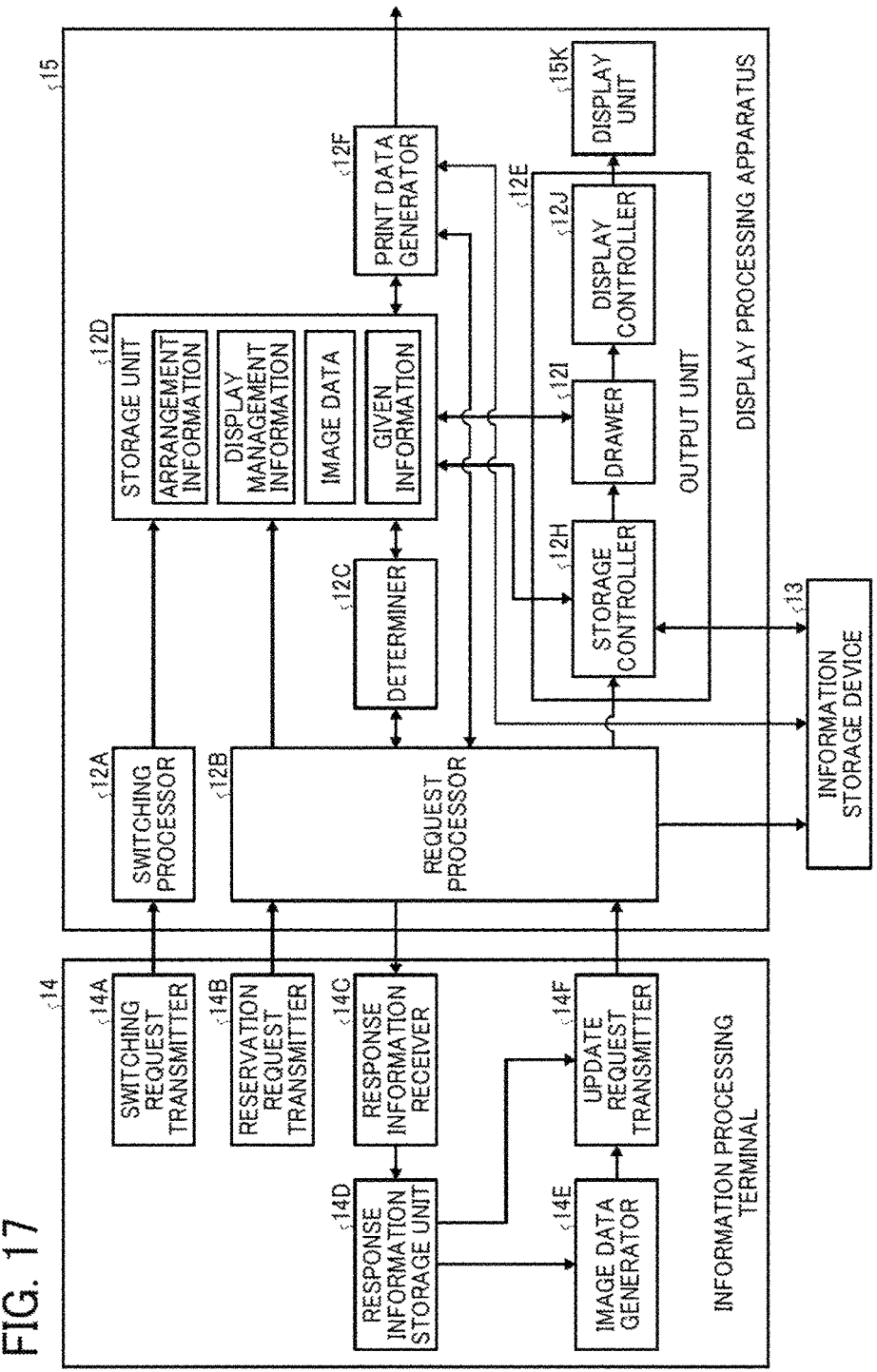

INFORMATION PROCESSING SYSTEM, DISPLAY PROCESSING APPARATUS, DISPLAY PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-134518, filed on Jul. 6, 2016, and 2017-095303, filed on May 12, 2017, in the Japan Patent Office, the entire disclosure of which is hereby incorporated by reference herein.

BACKGROUND

Technical Field

The present invention relates to an information processing system, a display processing apparatus, a display processing method, and a non-transitory recording medium.

Description of the Related Art

The information processing systems are known, which display image data received from a plurality of information processing terminals. The information processing system collectively displays a plurality of pieces of image data received from the information processing terminals on one screen.

However, when switching from a display state in which the plurality of pieces of image data are collectively displayed on one screen to a display state in which one piece of image data is displayed on one screen, the system disconnects communication connections between a display processing apparatus displaying the image data and the information processing terminals transmitting image data that is not displayed. Accordingly, when switching back to the display state in which a plurality of pieces of image data are collectively displayed on one screen, communication connections between the display processing apparatus and the plurality of information processing terminals need to be reestablished, thus increasing a processing load.

SUMMARY

Example embodiments of the present invention include an information processing system including a plurality of information processing terminals, and a display processing apparatus to establish a communication with each of the plurality of information processing terminals through a network. The display processing apparatus includes: a first receiver to receive a switching request for switching from a shared-display mode in which a plurality of pieces of image data are collectively displayed on one screen to a fill-screen display mode in which one piece of image data is displayed on one screen; circuitry to display first image data received from a first information processing terminal of the plurality of information processing terminals on a display in the fill-screen display mode in response to the switching request; a first transmitter to transmit response information that includes non-display information indicating non-display of image data to a second information processing terminal of the plurality of information processing terminals in the full-screen display mode, the second information processing terminal being one or more information processing terminals other than the first information processing terminal; and a second receiver to receive an update request from the second information processing terminal in response to the response information, the update request not including second image data to be transmitted from the second information processing terminal and including predetermined information having a data amount smaller than a data amount of the second image data. The second information processing terminal includes: a third receiver to receive the response information including non-display information from the display processing apparatus; and a second transmitter to transmit the update request to the display processing apparatus in response to receiving the response information including the non-display information.

Example embodiments of the present invention include a display processing apparatus, a method performed by the display processing apparatus, and a non-transitory recording medium storing a control program for the display processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A and 6B are schematic diagrams illustrating exemplary data structures of display management information;

FIGS. 10A and 10B are a sequence diagram illustrating an exemplary operation of information processing;

FIGS. 11A to 11C are diagrams for describing examples of display management information;

FIGS. 12A and 12B are a sequence diagram illustrating an exemplary flow of information processing;

FIG. 17 is a block diagram illustrating an exemplary functional configuration of the information processing terminal and a display processing apparatus.

Figure 1:
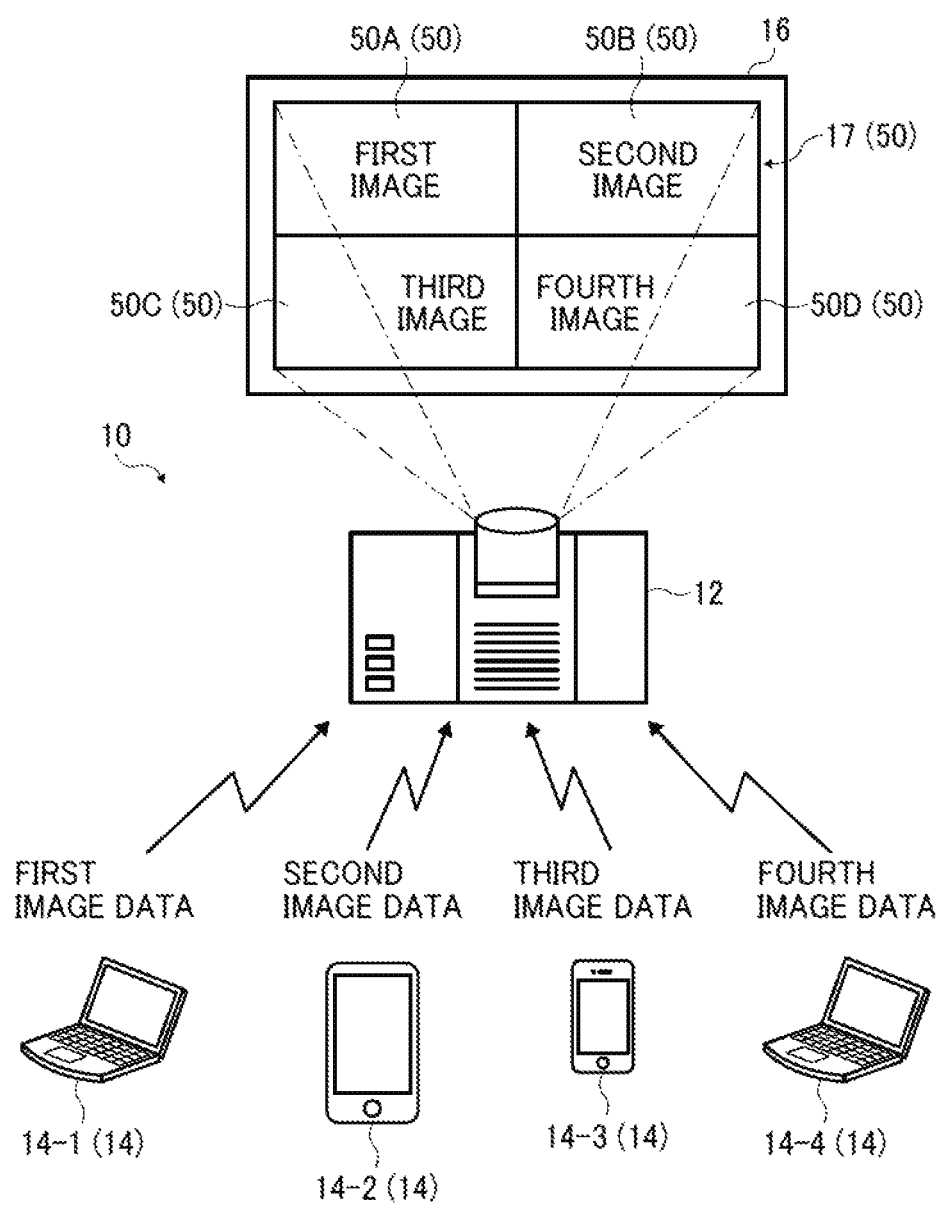
FIG. 1 is a schematic diagram illustrating an example of an information processing system.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the present invention will be described.

FIG. 1 is a schematic diagram illustrating an example of an information processing system 10 according to an embodiment of the present invention.

The information processing system 10 includes a display processing apparatus 12 and a plurality of information processing terminals 14 (14-1, 14-2, 14-3, and 14-4).

The display processing apparatus 12 is connected to each of the information processing terminals 14 via a wired communication network or a wireless communication network.

The display processing apparatus 12 displays image data received from the information processing terminals 14. In an embodiment of the present invention, the display processing apparatus 12 establishes a communication connection with each of the plurality of information processing terminals 14 and receives image data from each of the plurality of information processing terminals 14. The display processing apparatus 12 displays image data 50 received from each of the information processing terminals 14 on a display unit.

The display processing apparatus 12 is, for example, a projector. In this case, a screen 16 having a projection surface corresponds to the display unit. That is, the display processing apparatus 12 projects (displays) the image data 50 received from each of the information processing terminals 14 onto the screen 16.

In another example, the display processing apparatus 12 displays the image data 50 on a display. In this case, the display corresponds to the display unit. In the following, the exemplary case where the display processing apparatus 12 is a projector is described.

The display processing apparatus 12 can switch between full-screen display in which one piece of image data 50 is displayed on a display area 17 on the screen 16 and shared display in which a plurality of pieces of image data 50 received from the information processing terminals 14 are collectively displayed on the display area 17 on the screen 16.

In the example in FIG. 1, the display processing apparatus 12 receives first to fourth image data respectively from the plurality of information processing terminals 14 (information processing terminals 14-1 to 14-4). The display processing apparatus 12 puts together the first to fourth image data 50 (50A to 50D) on the display area 17 and projects the display area 17 onto the screen 16. The number of pieces of image received at the display processing apparatus 12 is not limited to four, such that any number of pieces of image data may be received. In shared display by the display processing apparatus 12, two or more pieces of image data 50 are collectively displayed, however, shared display is not limited to a form in which four pieces of image data 50 are put together. Switching between full-screen display and shared display by the display processing apparatus 12 will be described in detail below.

The information processing terminals 14 transmit image data to be displayed to the display processing apparatus 12. Each of the information processing terminals 14 is, for example, a computer, such as a laptop computer, a tablet terminal, or a smartphone, that performs information processing. Any of the information processing terminals 14 may be an apparatus that reads image data from a recording medium, such as an external hard disk drive (HDD) or an SD card, and outputs the image data to an external apparatus. Any of the information processing terminals 14 may be a video reproduction apparatus that reproduces image data. Any of the information processing terminals 14 may be a reception apparatus that receives a broadcast signal or a communication signal from a broadcasting station and reproduces video data.

In FIG. 1, the state in which the display processing apparatus 12 establishes communication connections with the four information processing terminals 14 (14-1, 14-2, 14-3, and 14-4) is illustrated, for example. However, the number of the information processing terminals 14 with which the display processing apparatus 12 establishes communication connections may be less than or greater than four, as long as at least one information processing terminal 14 establishes a communication connection.

Figure 2:
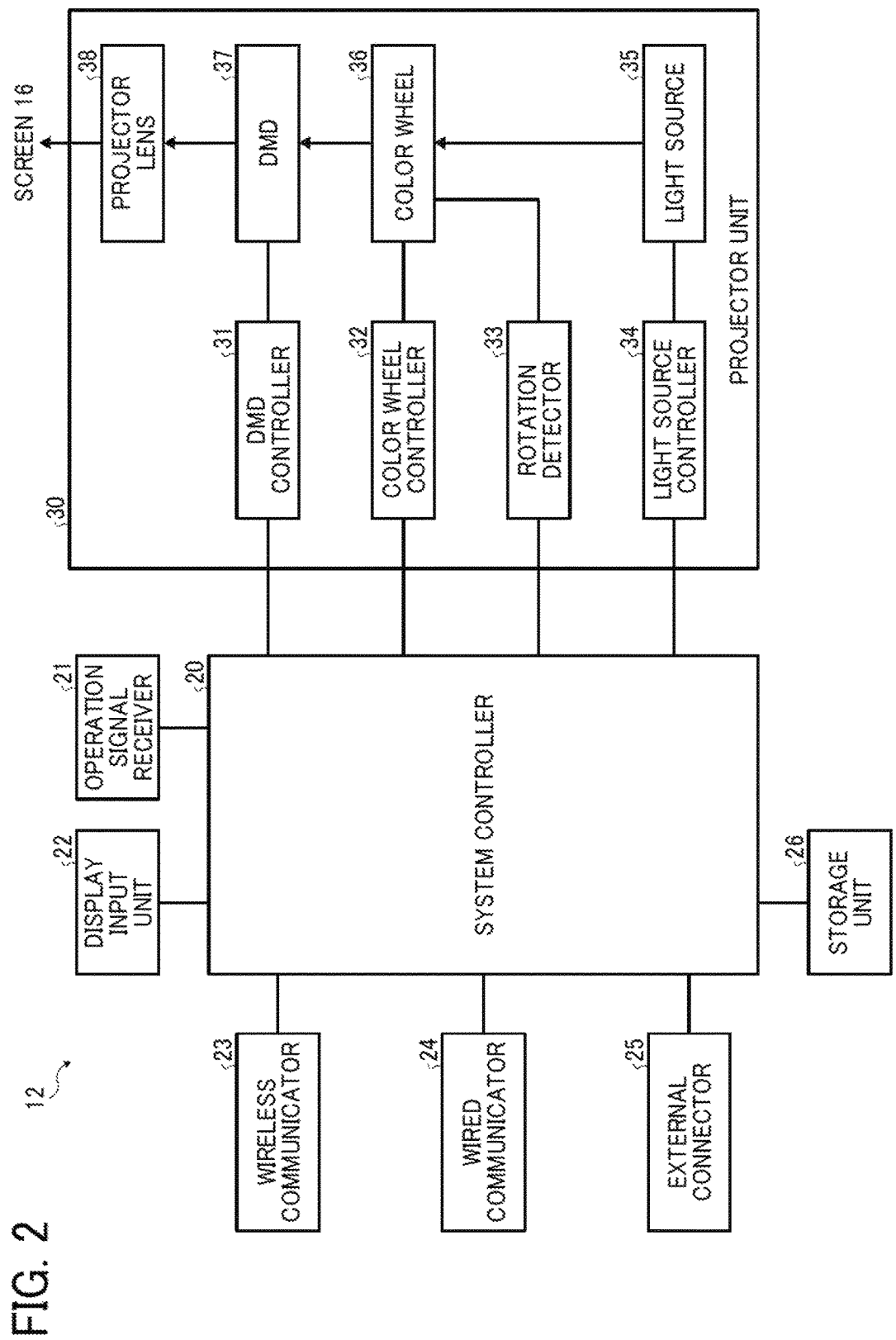
FIG. 2 is a diagram illustrating an exemplary hardware configuration of a display processing apparatus.

Now, the hardware configuration is described. FIG. 2 is a diagram illustrating an exemplary hardware configuration of the display processing apparatus 12. The display processing apparatus 12 includes a system controller 20, a projector unit 30, a storage unit 26, an external connector 25, a wired communicator 24, a wireless communicator 23, a display input unit 22, and an operation signal receiver 21.

The system controller 20 includes, for example, a central processing unit (CPU) and peripheral circuits, such as a random access memory (RAM) and a read-only memory (ROM). The system controller 20 executes a program stored in the storage unit 26, for example, to control the entire display processing apparatus 12.

The storage unit 26 includes a RAM, a ROM, and a flash memory, for example. The storage unit 26 stores various programs executed by the display processing apparatus 12, image data received from the information processing terminals 14 for projection onto a projection surface, and various types of setting information.

The external connector 25 is an interface for inputting video data received from an external apparatus, namely, an image output signal from a computer, or a High-Definition Multimedia Interface (HDMI) (registered trademark) signal or a video signal from a video device, for example. The wired communicator 24 includes a wired local area network (LAN) interface and a communication controller for the interface.

The wireless communicator 23 includes a wireless LAN interface and a communication controller for the interface. The wireless communicator 23 connects the display processing apparatus 12 with the information processing terminals 14 over a network.

The display input unit 22 includes an operation key or a touch panel, for example, and displays various types of information. The display input unit 22 receives a user operation performed by using the operation key, the touch panel, or the like. The operation signal receiver 21 receives an operation signal from a remote controller and so on to input a user operation.

The projector unit 30 includes a light source 35, a light source controller 34, a color wheel 36, a rotation detector 33, a color wheel controller 32, a digital mirror device (DMD) 37, a DMD controller 31, and a projector lens 38.

The light source 35 is a light source for projection, namely, a lamp or a solid-state light source, such as a light emitting diode (LED) or a semiconductor laser. The light source controller 34 controls the brightness of the light source 35 and turns on and off the light source 35, for example.

The color wheel 36 is a disc or the like that is color-coded with three colors of red, blue, and green, for example. The color wheel 36, which spins at a high speed, filters the light, which is emitted from the light source 35 and passes through the color wheel 36. The rotation detector 33 detects the rotation state of the color wheel 36. The color wheel controller 32 controls the rotation of the color wheel 36.

The DMD 37 is a display element having a large number of micro mirrors that are arranged on its surface. The DMD controller 31 controls the position (tilting) of the micro mirror of the DMD 37 for each pixel in accordance with image data to be projected. The projector lens 38 is used to project light that passes through the DMD 37 onto the screen 16. The DMD 37 and the color wheel 36 are display elements for image projection, for example. Another display element, such as a liquid crystal display (LCD), may be used.

The light, which is emitted from the light source 35, is filtered with the color wheel 36, and then reflected by the DMD 37 in which the position of the micro mirror is controlled for each pixel in accordance with image data. The reflected light is incident on the screen 16 via the projector lens 38 to form an image.

Figure 3:
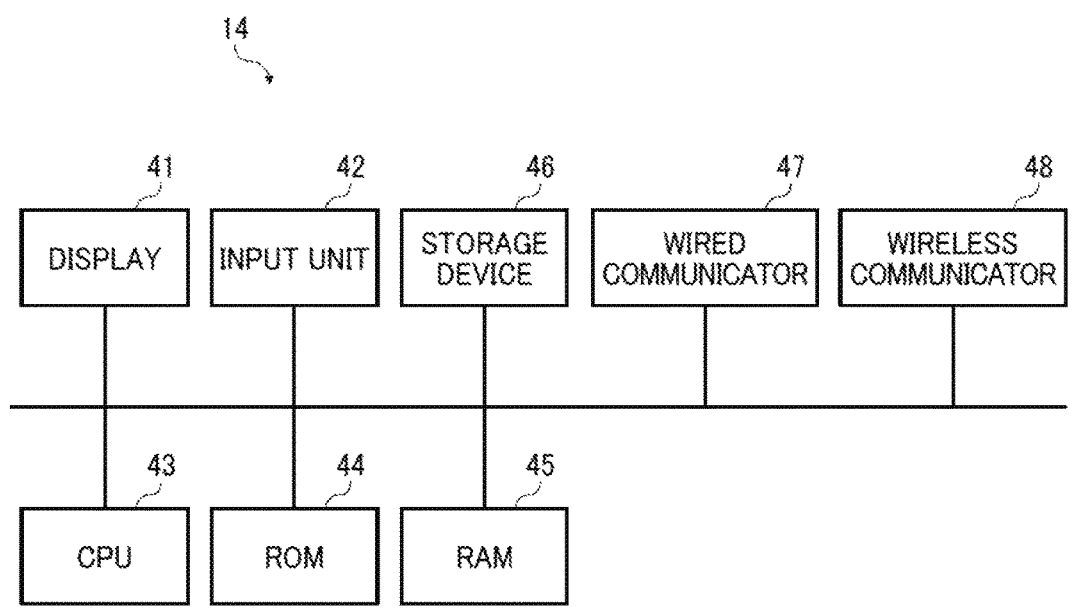
FIG. 3 is a diagram illustrating an exemplary hardware configuration of an information processing terminal.

FIG. 3 is a diagram illustrating an exemplary hardware configuration of the information processing terminal 14. The information processing terminal 14 has a configuration similar to that of a general-purpose computer. That is, the information processing terminal 14 includes a display 41, an input unit 42, a CPU 43, a ROM 44, a RAM 45, a storage device 46, a wired communicator 47, and a wireless communicator 48. These units are connected with one another via a bus.

The display 41 is a display device, such as an LCD. The display 41 displays information based on a display signal from the CPU 43. The input unit 42 is a keyboard, a mouse, or the like used to input a user instruction. The input unit 42 provides the user instruction to the CPU 43. The display 41 and the input unit 42 may be combined to form a touch panel, for example.

The CPU 43 is a processor, for example, that executes a program to perform data processing and control. The CPU 43 uses a predetermined area of the RAM 45 as a work area, performs various processes in cooperation with various programs stored in advance in the ROM 44 or in the storage device 46, and centrally controls operations of the hardware of the information processing terminal 14. The CPU 43 controls the display 41, the input unit 42, the wired communicator 47, and the wireless communicator 48 in cooperation with a program stored in advance in the ROM 44 or in the storage device 46.

The ROM 44 is a nonvolatile memory and stores a program and various types of information used in control of the information processing terminal 14. The RAM 45 is a volatile memory and functions as a work area for the CPU 43.

The storage device 46 is a rewritable storage device, namely, a semiconductor storage medium, such as a flash memory, or a magnetically or optically recordable storage medium. The storage device 46 stores a program and various types of information used in control of the information processing terminal 14.

The wired communicator 47 includes a wired LAN interface and a communication controller for the interface. The wireless communicator 48 includes a wireless LAN interface and a communication controller for the interface. The wireless communicator 48 connects the information processing terminal 14 with the display processing apparatus 12 over a network.

Figure 4:
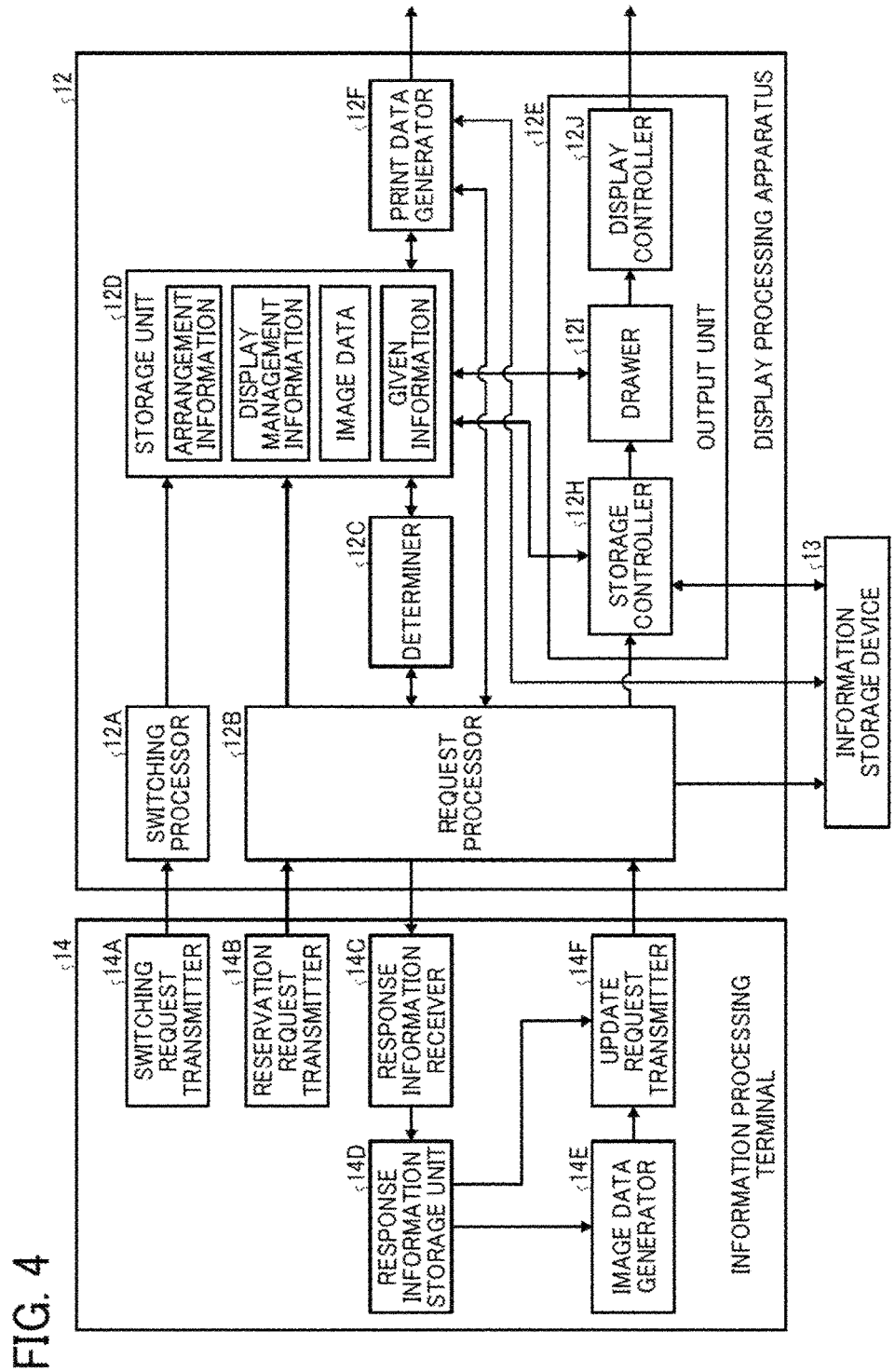
FIG. 4 is a block diagram illustrating an exemplary functional configuration of the display processing apparatus and the information processing terminal.

FIG. 4 is a block diagram illustrating an exemplary functional configuration of the display processing apparatus 12 and the information processing terminal 14 according to the present embodiment.

The display processing apparatus 12 includes a switching processor 12A, a request processor 12B, a determiner 12C, a storage unit 12D, an output unit 12E, and a print data generator 12F. The information processing terminal 14 includes a switching request transmitter 14A, a reservation request transmitter 14B, a response information receiver 14C, a response information storage unit 14D, an image data generator 14E, and an update request transmitter 14F.

The storage unit 12D of the display processing apparatus 12 stores various types of information. The storage unit 12D is implemented by using the storage unit 26 (see FIG. 2). The storage unit 12D stores arrangement information, display management information, image data, predetermined information, and so on.

The arrangement information indicates, for each of the pieces of image data 50 collectively displayed on one screen, which is the display area 17, the arrangement on the display area 17 and so on.

The arrangement information includes a display type, a displayable area, and the drawing position of each piece of image data 50.

As the display type, full-screen display or shared display is set. The full-screen display represents a display state in which only one piece of image data 50 is displayed on the display area 17 on the screen 16. The shared display represents a display state in which a plurality of pieces of image data 50 (four pieces of image data 50 in the present embodiment) are collectively displayed on the display area 17 on the screen 16.

The displayable area represents a range of the pixels on the display area 17 in which one or more pieces of image data 50 can be displayed. As the displayable area, the range from the coordinates (x, y)=(0, 0) to the coordinates (x, y)=(1280, 800), for example, is indicated.

The drawing position of each piece of image data 50 includes the coordinates of the starting point, the width, and the height. The coordinates of the starting point indicate the coordinates of the starting point from which the mage data 50 is drawn. The width indicates the number of pixels in the width direction (X direction) of the image data 50. The height indicates the number of pixels in the height direction (Y direction) of the image data 50.

In an embodiment of the present invention, the display processing apparatus 12 switches the display type in the arrangement information. Accordingly, the display processing apparatus 12 switches between full-screen display in which one piece of image data 50 is displayed on the display area 17 on the screen 16 and shared display in which a plurality of pieces of image data 50 are collectively displayed on the display area 17 on the screen 16. Specifically, in an embodiment of the present invention, the display processing apparatus 12 switches between full-screen display and shared display in response to a switching request received from the information processing terminal 14 (the details will be described below).

In the present embodiment, an exemplary case is described in which the display processing apparatus 12 switches the display state between full-screen display in which one piece of image data 50 is displayed on the display area 17 on the screen 16 and shared display in which four pieces of image data 50 are collectively displayed on the display area 17 on the screen 16.

Each of the pieces of image data 50 put together on the display area 17 on the screen 16 is assigned a specific image number. For example, the first piece of image data 50 is assigned an image number 1, the second piece of image data 50 is assigned an image number 2, the third piece of image data 50 is assigned an image number 3, and the fourth piece of image data 50 is assigned an image number 4.

Figure 5A:
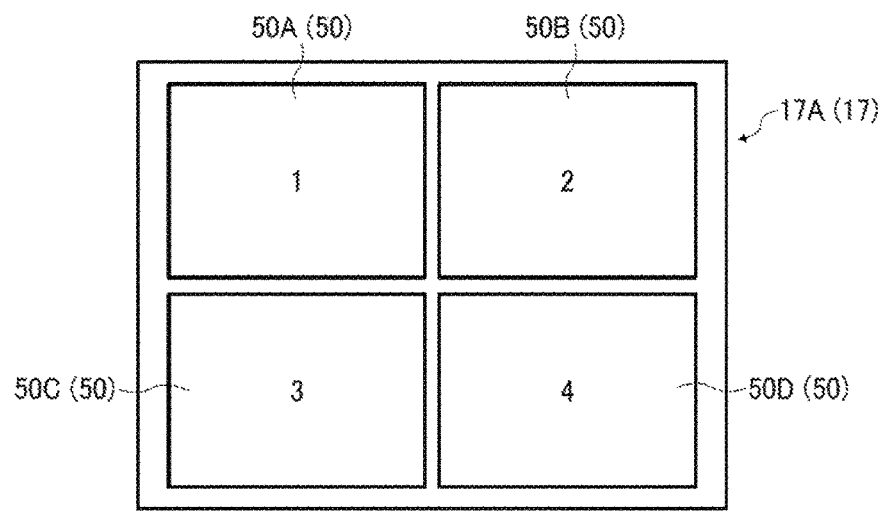
FIGS. 5A and 5B are schematic diagrams illustrating an example of screen switching.
Figure 5B:
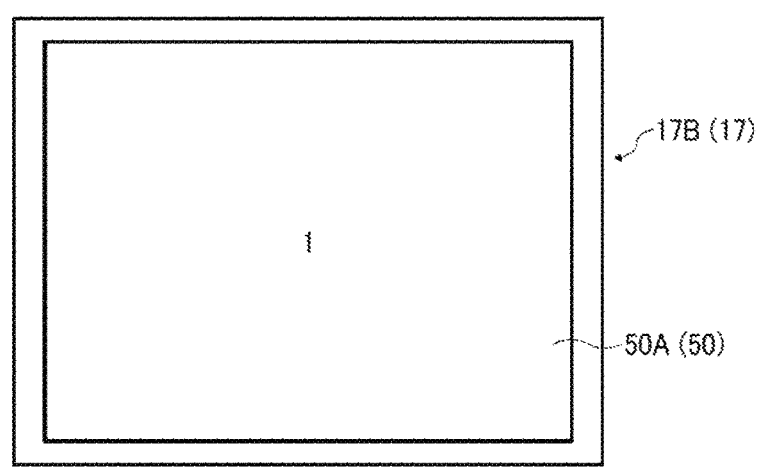

FIGS. 5A and 5B are schematic diagrams illustrating an example of screen switching. As illustrated in FIGS. 5A and 5B, the display processing apparatus 12 switches between shared display (see FIG. 5A) in which four pieces of image data 50 (50A to 50D) are collectively displayed on a display area 17A on the screen 16 and full-screen display (see FIG. 5B) in which one piece of image data 50 (for example, the piece of image data 50A) is displayed on a display area 17B on the screen 16 in response to a switching request received from one of the information processing terminals 14.

The display processing apparatus 12 is capable of switching the display state between shared display and full-screen display in response to a switching request.

Referring back to FIG. 4, description is further given. The display management information is information regarding the information processing terminal 14 that has an established communication connection with the display processing apparatus 12 and is used to manage display.

FIGS. 6A and 6B are schematic diagrams illustrating exemplary data structures of the display management information. The display management information includes identification information, a display status, an image size, and an update frequency for each of the plurality of information processing terminals 14 having an established communication connection. The display management information is updated by the switching processor 12A or the request processor 12B, for example (the details will be described below). The display management information is updated by the switching processor 12A or the request processor 12B, for example, to have the data structure illustrated in FIG. 6A or the data structure illustrated in FIG. 6B.

The display management information includes a number of entries (records), the number corresponding to the number of the information processing terminals 14 that can simultaneously establish a communication connection with the display processing apparatus 12. In each of the entries, the information processing terminal 14 that has an established communication connection with the display processing apparatus 12 is registered. Accordingly, in a case where the number of the information processing terminals 14 that are connected with the display processing apparatus 12 is smaller than the maximum number of the information processing terminals 14 that can be connected with the display processing apparatus 12, the display management information includes an empty entry as illustrated in FIG. 6B. In an embodiment of the present invention, description is given of an exemplary case where the display management information includes four entries.

The identification information in the display management information is information for identifying a job that is identified from information set in the entry. In an embodiment of the present invention, as the identification information in the display management information, identification information of the information processing terminal 14 that is registered in the entry is used.

The display status indicates the display state, in the display processing apparatus 12, of the image data 50 received from the information processing terminal 14 that is registered in the entry.

Specifically, the display status indicates full-screen display, shared display, or non-display. The full-screen display indicates a display state in which the image data 50 that is received is displayed alone on the display area 17 on the screen 16. The shared display indicates a display state in which the image data 50 that is received is displayed on the display area 17 on the screen 16 together with one or more pieces of image data 50 received from one or more of the other information processing terminals 14 in a collective manner. The non-display indicates a display state in which the image data 50 that is received is not displayed on the display area 17 on the screen 16.

In a case where the display status of one of the information processing terminals 14 is shared display, the display statuses of the other information processing terminals 14 are set to shared display, as illustrated in FIG. 6A. In a case where the display status of one of the information processing terminals 14 is full-screen display, for example, the display statuses of the other information processing terminals 14 are set to non-display, as illustrated in FIG. 6B.

The image size in the display management information is the image size of the image data 50 received from the information processing terminal 14 that is registered in the entry when the image data 50 is displayed. The image size is represented by a resolution, for example.

The update frequency in the display management information is the update frequency of the image data 50 received from the information processing terminal 14 that is registered in the entry. For example, the update frequency indicates the number of images updated per second (frames per second).

Referring back to FIG. 4, description is further given. The predetermined information is information transmitted from the information processing terminal 14 and is information other than image data to be displayed. The predetermined information will be described in detail below.

The switching processor 12A of the display processing apparatus 12 is an example of a switching request receiver. The switching processor 12A receives a switching request from the information processing terminal 14.

The switching request transmitter 14A of the information processing terminal 14 transmits a switching request to the display processing apparatus 12 to request switching of the display state.

The switching request is a full-screen switching request or a switching-to-sharing request, for example.

The full-screen switching request indicates a request for switching from shared display to full-screen display. The switching-to-sharing request indicates a request for switching from full-screen display to shared display. In the present embodiment, the switching request includes identification information of the information processing terminal 14 that is the transmission source of the switching request and a display status for which switching is requested. That is, a switching request that includes the display status "full-screen display" corresponds to the full-screen switching request, and a switching request that includes the display status "shared display" corresponds to the switching-to-sharing request.

The switching processor 12A of the display processing apparatus 12 is an example of a switching request receiver. The switching processor 12A receives a switching request from the information processing terminal 14. The switching request is the full-screen switching request or the switching-to-sharing request, as described above. That is, the switching processor 12A receives the full-screen switching request or the switching-to-sharing request from the information processing terminal 14.

In response to receiving a switching request, the switching processor 12A of the display processing apparatus 12 sets the display status, in the display management information, corresponding to the identification information of the information processing terminal 14 that is the transmission source of the switching request to the display status included in the switching request.

Specifically, in a case where the display status included in the switching request is "full-screen display", the switching processor 12A sets the display status, in the display management information, corresponding to the identification information of the information processing terminal 14 that is the transmission source of the switching request to "full-screen display". Further, the switching processor 12A sets the display status, in the display management information, corresponding to identification information of any information processing terminal 14 other than the transmission source of the switching request to "non-display".

Accordingly, in the case where the display status included in the switching request received from the information processing terminal 14 is "full-screen display", the switching processor 12A switches the display state from shared display to full-screen display.

In a case where the display status included in the switching request is "shared display", the switching processor 12A sets the display status, in the display management information, corresponding to the identification information of the information processing terminal 14 that is the transmission source of the switching request to "shared display". Further, the switching processor 12A sets the display status, in the display management information, corresponding to identification information of any information processing terminal 14 other than the transmission source of the switching request to "shared display".

Accordingly, in the case where the display status included in the switching request received from the information processing terminal 14 is "shared display", the switching processor 12A switches the display state from full-screen display to shared display.

The switching processor 12A sets, as the image size and the update frequency, in the display management information, corresponding to identification information of each information processing terminal 14, predetermined values in accordance with the display status.

For example, the display processing apparatus 12 stores in advance an image size and an update frequency corresponding to each of the display statuses, namely, "full-screen display", "shared display", and "non-display", in the storage unit 12D. The display processing apparatus 12 stores in advance, as the image size and the update frequency for the display status "full-screen display", values larger than those for the display status "shared display". In other words, the display processing apparatus 12 stores in advance, as the image size and the update frequency for the display status "shared display", values smaller than those for the display status "full-screen display". Further, the display processing apparatus 12 stores in advance "0" (zero) as the image size for the display status "non-display". The display processing apparatus 12 stores in advance a value equal to or lower than the update frequency for the display status "shared display" as the update frequency corresponding to the display status "non-display".

The switching processor 12A reads an image size and an update frequency corresponding to the display status newly set in the display management information from the storage unit 12D, and sets the image size and the update frequency in the display management information.

The request processor 12B processes various requests received from the information processing terminal 14. The request processor 12B is an example of an update request receiver and a response information transmitter. The request processor 12B receives a reservation request and an update request from the information processing terminal 14.

The reservation request includes identification information of the information processing terminal 14. The reservation request transmitter 14B of the information processing terminal 14 transmits the reservation request to the display processing apparatus 12 before transmitting image data to be displayed to the display processing apparatus 12.

In response to receiving a reservation request from the information processing terminal 14, the request processor 12B of the display processing apparatus 12 sets an entry corresponding to the information processing terminal 14 that is the transmission source of the reservation request in the display management information. That is, the request processor 12B sets a new entry number in the display management information. The request processor 12B sets the identification information of the information processing terminal 14 included in the reservation request in the display management information in association with the set entry number. Accordingly, a communication connection between the information processing terminal 14 and the display processing apparatus 12 is established. In a case where no empty entry is present in the display management information, the request processor 12B does not have to set the information processing terminal 14 that is the transmission source of the reservation request in the display management information.

In a case where identification information of any information processing terminal 14 other than the transmission source of the reservation request is not set in the display management information in the storage unit 12D, the request processor 12B sets the display status, in the display management information, corresponding to the information processing terminal 14 that is the transmission source of the reservation request to "full-screen display".

The request processor 12B sets, as the image size and the update frequency corresponding to the display status "full-screen display", predetermined values in accordance with the display status. That is, the request processor 12B sets the image size and the update frequency in the display management information in a similar manner as the switching processor 12A does. Specifically, the request processor 12B reads an image size and an update frequency corresponding to the display status newly set in the display management information from the storage unit 12D, and sets the image size and the update frequency in the display management information.

In a case where identification information of any information processing terminal 14 other than the transmission source of the reservation request is registered in the display management information in the storage unit 12D, the request processor 12B sets the display status corresponding to the set identification information of the information processing terminal 14 and the display status corresponding to the identification information of the information processing terminal 14 that is the transmission source of the reservation request to "shared display". The request processor 12B reads an image size and an update frequency corresponding to the display status "shared display" from the storage unit 12D, and sets the image size and the update frequency in the display management information in association with the pieces of identification information.

The request processor 12B transmits response information to the information processing terminal 14 that is the transmission source of the reservation request. The response information includes the display status, the image size, and the update frequency, in the display management information, corresponding to the identification information of the information processing terminal 14 that is the transmission destination.

The response information receiver 14C of the information processing terminal 14 receives the response information from the display processing apparatus 12. The response information storage unit 14D of the information processing terminal 14 stores the response information received by the response information receiver 14C.

The image data generator 14E of the information processing terminal 14 generates image data having a resolution that corresponds to the image size included in the response information at the update frequency included in the response information.

The update request transmitter 14F of the information processing terminal 14 transmits an update request that includes the image data generated by the image data generator 14E and a display status to the display processing apparatus 12.

The update request includes identification information of the information processing terminal 14 that is the transmission source of the update request, a display status that is requested, and image data to be displayed. The display status included in the update request is a display status (non-display information) that indicates non-display of the image data 50, a display status (full-screen display information) that indicates full-screen display of the image data 50, or a display status (shared-display information) that indicates shared display of the image data 50.

In an embodiment of the present invention, the display status (non-display information) that indicates non-display of the image data 50 is referred to as the display status "non-display" and description is given. In an embodiment of the present invention, the display status (full-screen display information) that indicates full-screen display of the image data 50 is referred to as the display status "full-screen display" and description is given. In an embodiment of the present invention, the display status (shared-display information) that indicates shared display of the image data 50 is referred to as the display status "shared display" and description is given.

In response to receiving from the display processing apparatus 12 response information that includes an image size and the display status "shared display" (shared-display information), the update request transmitter 14F of the information processing terminal 14 transmits an update request that includes image data having a resolution that corresponds to the image size and the display status "shared display" (shared-display information) to the display processing apparatus 12. At this time, the update request transmitter 14F transmits the update request to the display processing apparatus 12 at a transmission frequency corresponding to an update frequency included in response information received last from the display processing apparatus 12.

In response to receiving from the display processing apparatus 12 response information that includes an image size and the display status "full-screen display" (full-screen display information), the update request transmitter 14F of the information processing terminal 14 transmits an update request that includes image data having a resolution that corresponds to the image size and the display status "full-screen display" (full-screen display information) to the display processing apparatus 12. At this time, the update request transmitter 14F transmits the update request to the display processing apparatus 12 at a transmission frequency corresponding to an update frequency included in the response information received from the display processing apparatus 12.

In response to receiving from the display processing apparatus 12 response information that includes an image size and the display status "non-display" (non-display information), the update request transmitter 14F of the information processing terminal 14 transmits dummy data that does not include image data and includes predetermined information to the display processing apparatus 12. The transmission of the dummy data will be described in detail below.

In response to receiving an update request from the information processing terminal 14, the request processor 12B of the display processing apparatus 12 calls the determiner 12C.

The determiner 12C of the display processing apparatus 12 determines whether the display status included in the update request matches the display status corresponding to identification information of the information processing terminal 14 that is the transmission source of the update request and that is registered in the display management information. That is, the determiner 12C determines whether the display status included in the update request matches the display status in an entry, in the display management information, corresponding to the information processing terminal 14 that is the transmission source of the update request. The determiner 12C returns the result of determination to the request processor 12B.

In a case where the display status included in the update request matches the display status corresponding to the identification information of the information processing terminal 14 that is the transmission source of the update request and that is registered in the display management information, the request processor 12B of the display processing apparatus 12 feeds the image data included in the update request to the output unit 12E. Further, the request processor 12B transmits response information to the information processing terminal 14 that is the transmission source of the update request.

On the other hand, in a case where the display status included in the update request does not match the display status corresponding to the information processing terminal 14 that is the transmission source of the update request and that is registered in the display management information, the request processor 12B transmits response information to the information processing terminal 14 that is the transmission source of the update request without feeding the image data to the output unit 12E.

There may be a case where the display status, in the display management information, corresponding to the identification information of the information processing terminal 14 included in the received update request is "non-display". In this case, the request processor 12B of the display processing apparatus 12 transmits response information that includes the display status "non-display" (non-display information) to the information processing terminal 14.

The response information receiver 14C of the information processing terminal 14 receives response information from the display processing apparatus 12. In a case where the received response information includes the display status "non-display" (non-display information), the update request transmitter 14F of the information processing terminal 14 transmits an update request that includes dummy data to the display processing apparatus 12.

The dummy data does not include image data to be displayed and includes predetermined information. That is, in this case, the update request transmitter 14F of the information processing terminal 14 transmits an update request that does not include image data to be displayed and includes predetermined information to the display processing apparatus 12.

The data amount of the predetermined information is smaller than the data amount of image data to be displayed. Specifically, the predetermined information is data having a size smaller than the minimum image size of the image data 50 to be displayed on the screen 16. The predetermined information is, for example, text data, static image data having a size smaller than the minimum image size of image data to be displayed on the screen 16, or audio data. The predetermined information is input through an operation instruction, for example, given by a user operating the information processing terminal 14. In this disclosure, the predetermined information, which is determined based on an instruction given by the user, may be referred to as the given information.

Also in a case where the display status included in the update request is "non-display", the request processor 12B of the display processing apparatus 12 calls the determiner 12C as described above. The determiner 12C returns the result of determination to the request processor 12B. Here, in at least one of the case where the display status "non-display" included in the update request matches the display status corresponding to the information processing terminal 14 that is the transmission source of the update request and that is registered in the display management information and the case where the display status "non-display" included in the update request does not match the display status described above, the request processor 12B feeds the dummy data included in the update request to the output unit 12E. In the case where the display status "non-display" included in the update request does not match the display status described above, the request processor 12B transmits response information to the information processing terminal 14 that is the transmission source of the update request.

Figures 7A, 7B, 8:
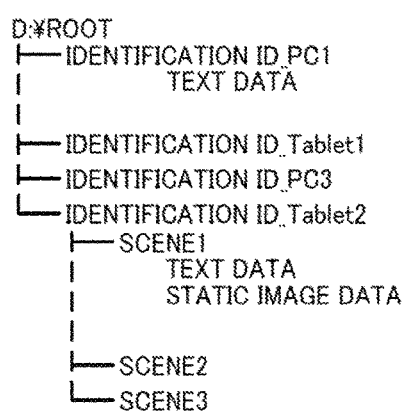
FIGS. 7A and 7B are diagrams for describing an example of dummy data.
FIG. 8 is a diagram for describing an example of storage of predetermined information.

FIGS. 7A and 7B are diagrams for describing an example of the dummy data. FIG. 7A is a diagram illustrating an exemplary data structure of the dummy data. FIG. 7B is a diagram illustrating examples of an information type included in the dummy data.

The dummy data includes predetermined (given) information, a predetermined-information size (given-information size) that indicates the size of the predetermined (given) information, and the information type. Note that the size of the dummy data is smaller than the data amount of image data to be displayed. For example, the dummy data has one byte. If the data amount of the dummy data is small, the information processing terminal 14 can reduce a load of communication with the display processing apparatus 12 while maintaining the connection with the display processing apparatus 12.

The information type indicates the type of the predetermined information. As illustrated in FIG. 7B, the information type is, for example, no information, text, and so on.

Referring back to FIG. 4, description is further given. In a case of receiving image data included in an update request from the request processor 12B, the output unit 12E of the display processing apparatus 12 displays the image data, namely, the image data 50, on the display area 17 in accordance with a display status, in the display management information, corresponding to the information processing terminal 14 that is the transmission source of the update request.

For example, in a case where the display status, in the display management information, corresponding to the information processing terminal 14 that is the transmission source of the update request is "full-screen display", the output unit 12E displays the image data 50 included in the update request in a full-screen mode. In a case where the display status, in the display management information, corresponding to the information processing terminal 14 that is the transmission source of the update request is "shared display", the output unit 12E displays the image data 50 included in the update request together with the image data 50 received from any other information processing terminal 14 in a shared manner. In a case where the display status, in the display management information, corresponding to the information processing terminal 14 that is the transmission source of the update request is "non-display", the output unit 12E does not display the image data included in the update request.

The output unit 12E includes a storage controller 12H, a drawer 12I, and a display controller 12J, for example.

The storage controller 12H stores image data included in an update request in the storage unit 12D in association with identification information of the information processing terminal 14 that is the transmission source of the update request. For example, in a case of newly receiving image data from the information processing terminal 14, the storage controller 12H updates image data, in the storage unit 12D, corresponding to the identification information of the information processing terminal 14 to the newly received image data.

There may be a case where the information processing terminal 14 transmits difference data that corresponds to a difference between consecutive frames to the display processing apparatus 12 as image data. In this case, the display processing apparatus 12 updates image data, in the storage unit 12D, corresponding to the identification information of the information processing terminal 14 with the received difference data.

The drawer 12I draws one or more pieces of image data stored in the storage controller 12H at one or more screen positions in accordance with the current display state (that is, full-screen display or shared display) to generate the display area 17. At this time, the drawer 12I draws each piece of image data 50 by using arrangement information that corresponds to the current display state to generate the display area 17. Accordingly, the drawer 12I puts together a plurality of pieces of image data 50 respectively received from the plurality of information processing terminals 14 on the display area 17 on the screen 16.

In a case where the current display state is full-screen display, the drawer 12I arranges only the image data 50 that corresponds to identification information of the information processing terminal 14 for which full-screen display is to be performed on the display area 17 on the screen 16.

The display controller 12J displays the display area 17 generated by the drawer 12I on the display unit. In the present embodiment, the display controller 12J projects the display area 17 on which one or more pieces of image data 50 are arranged onto the screen 16.

As described above, in a case where the display status included in a switching request is "full-screen display", the switching processor 12A sets the display status, in the display management information, corresponding to identification information of the information processing terminal 14 that is the transmission source of the switching request to "full-screen display". In this case, the switching processor 12A sets the display status, in the display management information, corresponding to identification information of any information processing terminal 14 other than the transmission source of the switching request to "non-display".

Accordingly, in a case of receiving a switching request (full-screen switching request) that includes the display status "full-screen display". The display controller 12J displays the image data 50 received from one information processing terminal 14 in a full-screen mode. The display controller 12J may display the image data 50 received from the information processing terminal 14 that is the transmission source of a switching request including the display status "full-screen display". The display controller 12J may display the image data 50 received from one of the plurality of information processing terminals 14 each having an established communication connection with the display processing apparatus 12 in a full-screen mode.

As described above, in a case where the display status included in an update request does not match the display status, in the display management information, corresponding to identification information of the information processing terminal 14 that is the transmission source of the update request, the request processor 12B transmits response information to the information processing terminal 14. Accordingly, in a case where the display controller 12J performs full-screen display, the request processor 12B transmits response information that includes the display status "non-display" (non-display information) to any information processing terminal 14 having an established communication connection other than the information processing terminal 14 that is the transmission source of the image data 50 displayed in a full-screen mode.

In a case where the response information received from the display processing apparatus 12 includes an image size and the display status "non-display" (non-display information), the update request transmitter 14F of the information processing terminal 14 transmits dummy data that does not include image data and includes predetermined information to the display processing apparatus 12.

As described above, in a case where the display status included in a switching request is "shared display", the switching processor 12A of the display processing apparatus 12 sets the display status, in the display management information, corresponding to identification information of the information processing terminal 14 that is the transmission source of the switching request to "shared display" In this case, the switching processor 12A sets the display status, in the display management information, corresponding to identification information of any information processing terminal 14 other than the transmission source of the switching request to "shared display".

Accordingly, in a case of receiving a switching request (switching-to-sharing request) that includes the display status "shared display", the display controller 12J puts together a plurality of pieces of image data 50 respectively received from the plurality of information processing terminals 14 each having an established communication connection on the display area 17 to display the pieces of image data 50 in a shared manner.

As described above, there may be a case where an update request received from the information processing terminal 14 includes dummy data. In this case, the storage controller 12H of the display processing apparatus 12 stores predetermined information included in the dummy data in the storage unit 12D.

Specifically, the storage controller 12H analyzes an information type included in the dummy data in the received update request. In a case where the information type indicates "no information", the storage controller 12H deletes the dummy data. In a case where the information type included in the dummy data in the received update request indicates a type other than "no information" (for example, "text"), the storage controller 12H stores the predetermined information included in the dummy data in the storage unit 12D.

Specifically, the storage controller 12H stores predetermined information in the storage unit 12D in association with identification information of the information processing terminal 14 that is the transmission source of the image data 50 that is projected (displayed) onto the screen 16 (display unit) at the time of reception of an update request that includes the predetermined information. In other words, the storage controller 12H stores predetermined information in the storage unit 12D in association with identification information of the information processing terminal 14 that is the transmission source of the image data 50 projected onto the screen 16 at the time of reception of the predetermined information.

The storage controller 12H may store predetermined information in the storage unit 12D in association with identification information of the information processing terminal 14, the image data 50 that is displayed on the screen 16 (display unit) at the time of reception of an update request that includes the predetermined information, and scene identification information for identifying the scene of the image data.

The scene of image data is identified by using a publicly known image processing method. For example, there may be a case where the display processing apparatus 12 receives difference data that corresponds to a difference between consecutive frames from the information processing terminal 14. In this case, the storage controller 12H of the display processing apparatus 12 identifies frames in a period from when full image data (not difference data but full image data of the image data 50) was previously received until when full image data is currently received among a plurality of consecutively received frames as one scene. Determination of reception of full image data is performed by determining whether the image size of received difference data matches the image size in the case of full-screen display.

The storage controller 12H may store predetermined information in an external information storage device 13 instead of the storage unit 12D or may store predetermined information in the storage unit 12D and also in the information storage device 13.

FIG. 8 is a diagram for describing an example of storage of predetermined information. FIG. 8 illustrates an exemplary case where predetermined information is text data or static image data. For example, the storage controller 12H generates directories that respectively correspond to the information processing terminals 14 that are the transmission sources of an update request in the storage unit 12D or in the information storage device 13. In the example illustrated in FIG. 8, as the name of each directory, identification information of the information processing terminal 14 that corresponds to the directory is used. The storage controller 12H stores predetermined information (text data or static image data, for example) in the directory of the information processing terminal 14 that is the transmission source of the image data 50 that is being displayed among the directories respectively corresponding to the information processing terminals 14 that are the transmission sources of an update request.

The storage controller 12H may create a directory for each scene of the image data 50 that is being displayed and store predetermined information in each directory. Accordingly, the storage controller 12H can store predetermined information in association with identification information of the information processing terminal 14 and scene identification information for identifying the scene of the image data 50 that is displayed on the screen 16 at the time of reception of an update request that includes the predetermined information.

The storage controller 12H may further store, in each directory, corresponding image data 50. Accordingly, the storage controller 12H can store predetermined information in association with identification information of the information processing terminal 14, the image data 50 that is displayed on the screen 16 (display unit) at the time of reception of an update request that includes the predetermined information, and scene identification information for identifying the scene of the image data.

Referring back to FIG. 4, description is further given. The print data generator 12F of the display processing apparatus 12 generates print data that includes predetermined information and image data that corresponds to the predetermined information stored in the storage unit 12D (or in the information storage device 13). The print data is data for image formation used by an image forming apparatus that forms an image on a recording medium.

For example, the print data generator 12F reads predetermined information (for example, text data or static image data), in the storage unit 12D, corresponding to identification information of the information processing terminal 14 and a scene. Further, the print data generator 12F reads image data that corresponds to the scene from the storage unit 12D. At this time, the print data generator 12F reads image data displayed by the display controller 12J at the time of reception of an update request that includes the predetermined information (or image data of the first frame among a plurality of frames that constitute the scene of the image data).

Figure 9:
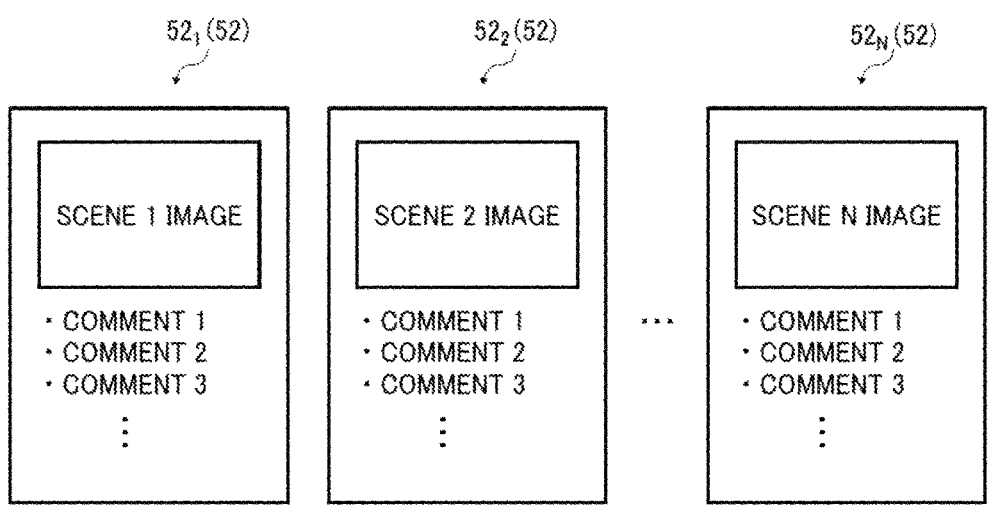
FIG. 9 is a schematic diagram illustrating examples of print data.

The print data generator 12F generates print data that includes the read predetermined information and image data. FIG. 9 is a schematic diagram illustrating examples of print data 52. It is assumed, for example, that the display processing apparatus 12 receives an update request that includes predetermined information, specifically, comment 1 to comment 3, from the information processing terminal 14 when pieces of image data 50 that respectively correspond to scene 1 to scene N (N is an integer equal to or larger than 2) are displayed.

In this case, the print data generator 12F of the display processing apparatus 12 generates pieces of print data 52 (pieces of print data $52_1$ to $52_N$) each including corresponding image data and corresponding predetermined information for the respective scenes (scene 1 to scene N). The print data generator 12F thereafter outputs the generated pieces of print data 52 to a generally available image forming apparatus, for example.

The print data generator 12F generates the print data 52 when receiving a print data generation instruction that is input in an operation instruction given by a user. The print data generator 12F may generate the print data 52 when receiving a signal indicating a print data generation instruction from the information processing terminal 14.

Figure 10B:
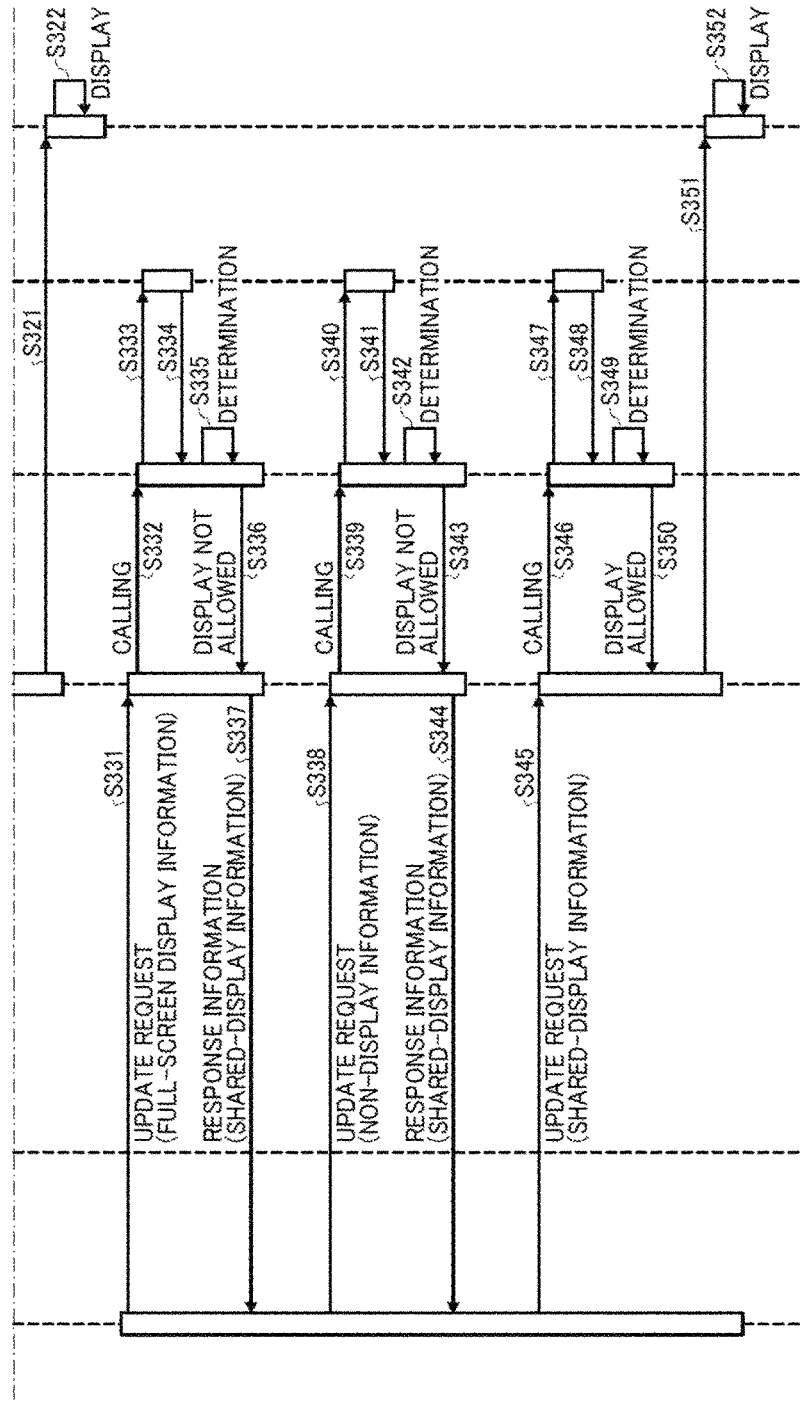

Now, the flow of information processing performed by the information processing system 10 is described. FIGS. 10A and 10B (FIG. 10) are a sequence chart illustrating an exemplary flow of information processing performed when reservation requests are received from the information processing terminals 14. It is assumed that none of the information processing terminals 14 are connected to the display processing apparatus 12 in a stage prior to the process in step S301.

For example, the reservation request transmitter 14B of the information processing terminal 14-1 transmits a reservation request that includes identification information of the information processing terminal 14-1 to the display processing apparatus 12 (step S301). When receiving the reservation request, the request processor 12B of the display processing apparatus 12 sets the identification information and so on in empty display management information (step S302).

FIGS. 11A to 11C are diagrams for describing examples of display management information. It is assumed that identification information of any information processing terminal 14 is not set in the display management information in the stage prior to the process in step S301. In the process in step S302, the request processor 12B sets identification information "001" of the information processing terminal 14-1, the display status "full-screen display", an image size "1280×800", and an update frequency "15 fps" in association with an entry number "1" (see FIG. 11A).

Referring back to FIG. 10, the request processor 12B of the display processing apparatus 12 thereafter transmits response information that includes the display status "full-screen display", an image size "1280×800", and an update frequency "15 fps" set in step S302 to the information processing terminal 14-1 (step S303).

Next, the update request transmitter 14F of the information processing terminal 14-1 transmits an update request that includes the display status "full-screen display" and image data to be displayed to the display processing apparatus 12 (step S304). When receiving the update request, the request processor 12B of the display processing apparatus 12 calls the determiner 12C (step S305). When called, the determiner 12C accesses the display management information in the storage unit 12D (steps S306 and S307) and determines whether the display status included in the update request matches the display status, in the display management information, corresponding to the identification information of the information processing terminal 14-1 (step S308). Here, both the display statuses are "full-screen display", and therefore, the determiner 12C determines that the display statuses match each other. The determiner 12C returns the result of determination indicating that display is allowed to the request processor 12B (step S309).

When receiving the result of determination indicating that display is allowed from the determiner 12C, the request processor 12B feeds the image data included in the update request received in step S304 to the output unit 12E (step S310). The display controller 12J of the output unit 12E displays only the received image data, which is the image data 50, on the display area 17 in a full-screen mode (step S311).

Further, it is assumed that the information processing terminal 14-2 transmits a reservation request that includes identification information of the information processing terminal 14-2 to the display processing apparatus 12 (step S312). When receiving the reservation request, the request processor 12B of the display processing apparatus 12 sets the display status, in the display management information, corresponding to the set identification information of the information processing terminal 14-1 and the display status, in the display management information, corresponding to the identification information of the information processing terminal 14-2, which is the transmission source of the reservation request, to "shared display" (step S313). The request processor 12B reads an image size and an update frequency corresponding to the display status "shared display" from the storage unit 12D and sets the image size and the update frequency in the display management information in association with the pieces of identification information (step S313).

After the process in step S313, the data structure of the display management information changes from the data structure illustrated in FIG. 11A to that illustrated in FIG. 11B.

Referring back to FIG. 10, the request processor 12B of the display processing apparatus 12 transmits response information to the information processing terminal 14-2, which is the transmission source of the reservation request (step S314). The response information transmitted to the information processing terminal 14-2 in step S314 includes the display status "shared display", an image size "640× 400", and an update frequency "5 fps", in the display management information, corresponding to the identification information of the information processing terminal 14-2.

Next, the information processing terminal 14-2 transmits an update request that includes the identification information of the information processing terminal 14-2, image data, and the display status "shared display" to the display processing apparatus 12 (step S315). When receiving the update request, the request processor 12B of the display processing apparatus 12 calls the determiner 12C (step S316).

When called, the determiner 12C accesses the display management information in the storage unit 12D (steps S317 and S318) and determines whether the display status included in the update request matches the display status, in the display management information, corresponding to the identification information of the information processing terminal 14-2 (step S319). Here, both the display statuses are "shared display" and match each other, and therefore, the determiner 12C returns the result of determination indicating that display is allowed to the request processor 12B (step S320).

When receiving the result of determination indicating that display is allowed from the determiner 12C, the request processor 12B of the display processing apparatus 12 feeds the image data included in the update request received in step S315 to the output unit 12E (step S321). The display controller 12J of the output unit 12E collectively displays the received image data and the image data received from the information processing terminal 14-1 on the display area 17 in a shared manner (step S322).

Here, it is assumed that the update request transmitter 14F of the information processing terminal 14-1 transmits an update request that includes image data and the display status "full-screen display" to the display processing apparatus 12 (step S331). When receiving the update request, the request processor 12B of the display processing apparatus 12 calls the determiner 12C (step S332). When called, the determiner 12C of the display processing apparatus 12 accesses the display management information in the storage unit 12D (steps S333 and S334) and determines whether the display status included in the update request matches the display status, in the display management information, corresponding to the identification information of the information processing terminal 14-1 (step S335).

Here, the display status included in the update request is "full-screen display" but the display status, in the display management information, corresponding to the identification information of the information processing terminal 14-1 is "shared display". Therefore, the display statuses do not match each other. Accordingly, in this case, the determiner 12C returns the result of determination indicating that display is not allowed to the request processor 12B (step S336).

When receiving the result of determination indicating that display is not allowed from the determiner 12C, the request processor 12B of the display processing apparatus 12 transmits response information to the information processing terminal 14-1 without feeding the image data to the output unit 12E (step S337). The response information includes the display status "shared display", an image size "640×400", and an update frequency "5 fps", in the display management information, corresponding to the identification information of the information processing terminal 14-1.

Further, it is assumed that the update request transmitter 14F of the information processing terminal 14-1 transmits an update request that includes the display status "non-display", dummy data, and the identification information of the information processing terminal 14-1 to the display processing apparatus 12 (step S338). When receiving the update request, the request processor 12B of the display processing apparatus 12 calls the determiner 12C (step S339). When called, the determiner 12C of the display processing apparatus 12 accesses the display management information in the storage unit 12D (steps S340 and S341) and determines whether the display status included in the update request matches the display status, in the display management information, corresponding to the identification information of the information processing terminal 14-1 (step S342).

Here, the display status included in the update request is "non-display" but the display status, in the display management information, corresponding to the identification information of the information processing terminal 14-1 is "shared display". Therefore, the display statuses do not match each other. Accordingly, in this case, the determiner 12C returns the result of determination indicating that display is not allowed to the request processor 12B (step S343).

When receiving the result of determination indicating that display is not allowed from the determiner 12C, the request processor 12B of the display processing apparatus 12 transmits response information to the information processing terminal 14-1 (step S344). The response information includes the display status "shared display", an image size "640×400", and an update frequency "5 fps", in the display management information, corresponding to the identification information of the information processing terminal 14-1. Further, in a case where the dummy data included in the update request received in step S338 includes predetermined information, the request processor 12B of the display processing apparatus 12 stores the predetermined information in the storage unit 12D or in the information storage device 13.

Further, it is assumed that the update request transmitter 14F of the information processing terminal 14-1 transmits an update request that includes the display status "shared display", image data, and the identification information of the information processing terminal 14-1 to the display processing apparatus 12 (step S345). When receiving the update request, the request processor 12B of the display processing apparatus 12 calls the determiner 12C (step S346). When called, the determiner 12C of the display processing apparatus 12 accesses the display management information in the storage unit 12D (steps S347 and S348) and determines whether the display status included in the update request matches the display status, in the display management information, corresponding to the identification information of the information processing terminal 14-1 (step S349).

Here, the display status included in the update request is "shared display" and matches the display status, which is "shared display", in the display management information, corresponding to the identification information of the information processing terminal 14-1. Accordingly, in this case, the determiner 12C returns the result of determination indicating that display is allowed to the request processor 12B (step S350).

When receiving the result of determination indicating that display is allowed from the determiner 12C, the request processor 12B of the display processing apparatus 12 feeds the image data included in the update request received in step S345 to the output unit 12E (step S351). The display controller 12J of the output unit 12E displays the received image data together with the image data received from the information processing terminal 14-2 in a shared manner (step S352).

Figure 12B:
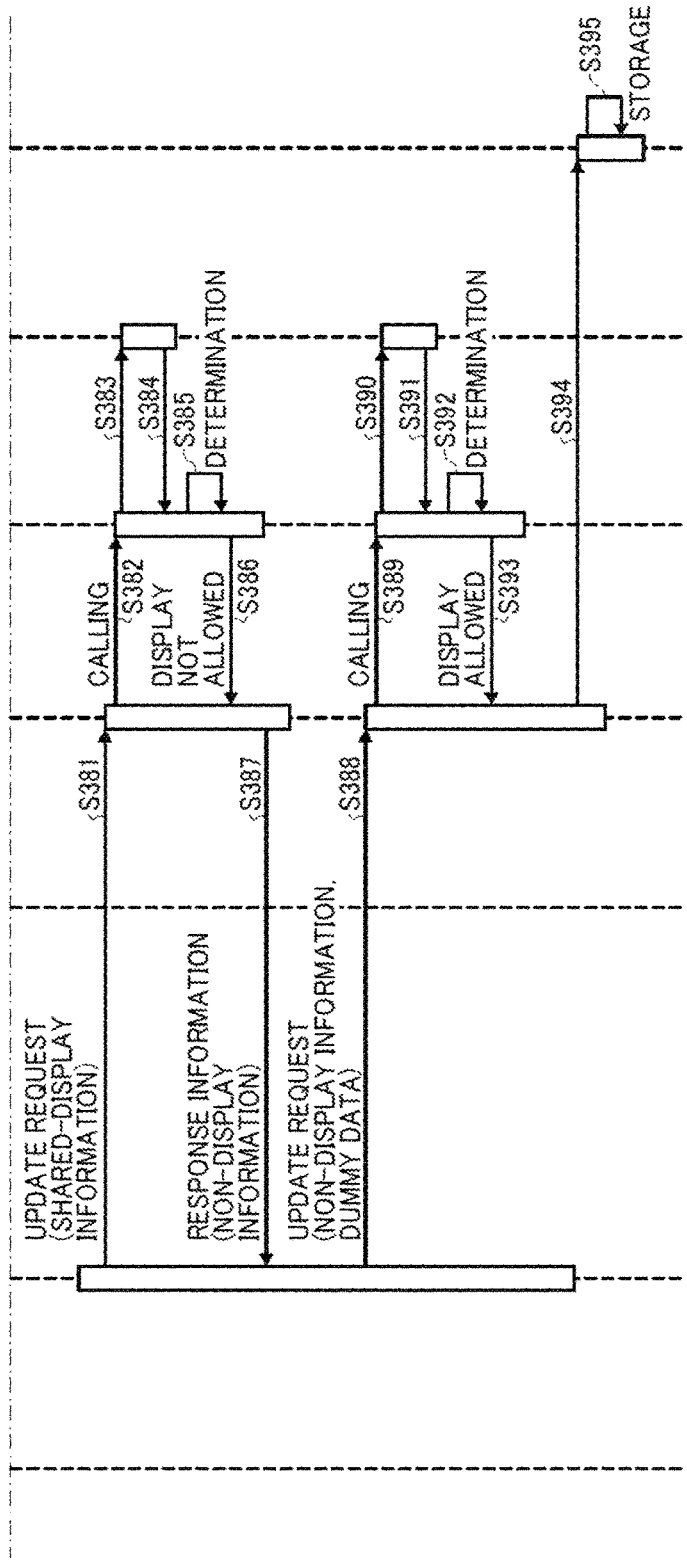

Now, the flow of information processing performed when the display processing apparatus 12 receives a switching request is described. FIGS. 12A and 12B (FIG. 12) are a sequence chart illustrating an exemplary flow of information processing performed when the display processing apparatus 12 receives a switching request from one of the information processing terminals 14. It is assumed that the display processing apparatus 12 performs shared display in a stage prior to the process in step S361.

For example, it is assumed that the switching request transmitter 14A of the information processing terminal 14-1 transmits a switching request (full-screen switching request) that includes the display status "full-screen display" to the display processing apparatus 12 (step S361). When receiving the switching request, the switching processor 12A of the display processing apparatus 12 sets the display status, in the display management information stored in the storage unit 12D, corresponding to identification information of the information processing terminal 14-1, which is the transmission source of the switching request, to "full-screen display" (step S362). In this case, the switching processor 12A sets the display status, in the display management information, corresponding to identification information of any information processing terminal 14 other than the transmission source of the switching request to "non-display" (step S362). Further, the switching processor 12A sets an image size and an update frequency corresponding to each display status in the display management information. Accordingly, after the process in step S362, the display management information is in a state where data as illustrated in FIG. 11C is set.

Referring back to FIG. 12, it is assumed that the update request transmitter 14F of the information processing terminal 14-1 transmits an update request that includes the display status "shared display", image data, and the identification information of the information processing terminal 14-1 to the display processing apparatus 12 (step S363). When receiving the update request, the request processor 12B of the display processing apparatus 12 calls the determiner 12C (step S364). When called, the determiner 12C of the display processing apparatus 12 accesses the display management information in the storage unit 12D (steps S365 and S366) and determines whether the display status included in the update request matches the display status, in the display management information, corresponding to the identification information of the information processing terminal 14-1 (step S367).

Here, the display status included in the update request is "shared display" but the display status, in the display management information, corresponding to the identification information of the information processing terminal 14-1 is "full-screen display". Therefore, the display statuses do not match each other. Accordingly, in this case, the determiner 12C returns the result of determination indicating that display is not allowed to the request processor 12B (step S368).

When receiving the result of determination indicating that display is not allowed from the determiner 12C, the request processor 12B of the display processing apparatus 12 transmits response information to the information processing terminal 14-1 without passing the image data to the output unit 12E (step S369). The response information includes the display status "full-screen display", an image size "1280× 800", and an update frequency "30 fps", in the display management information, corresponding to the identification information of the information processing terminal 14-1.

Further, it is assumed that the update request transmitter 14F of the information processing terminal 14-1 transmits an update request that includes the display status "full-screen display", image data, and the identification information of the information processing terminal 14-1 to the display processing apparatus 12 (step S370). When receiving the update request, the request processor 12B of the display processing apparatus 12 calls the determiner 12C (step S371). When called, the determiner 12C of the display processing apparatus 12 accesses the display management information in the storage unit 12D (steps S372 and S373) and determines whether the display status included in the update request matches the display status, in the display management information, corresponding to the identification information of the information processing terminal 14-1 (step S374).

Here, the display status included in the update request is "fill-screen display" and matches the display status, which is "full-screen display", in the display management information, corresponding to the identification information of the information processing terminal 14-1. Accordingly, in this case, the determiner 12C returns the result of determination indicating that display is allowed to the request processor 12B (step S375).

When receiving the result of determination indicating that display is allowed from the determiner 12C, the request processor 12B of the display processing apparatus 12 feeds the image data included in the update request received in step S370 to the output unit 12E (step S376). The display controller 12J of the output unit 12E displays the received image data, which is the image data 50, in a full-screen mode (step S377).

Further, it is assumed that the update request transmitter 14F of the information processing terminal 14-2 transmits an update request that includes the display status "shared display", image data, and identification information of the information processing terminal 14-2 to the display processing apparatus 12 (step S381). When receiving the update request, the request processor 12B of the display processing apparatus 12 calls the determiner 12C (step S382). When called, the determiner 12C of the display processing apparatus 12 accesses the display management information in the storage unit 12D (steps S383 and S384) and determines whether the display status included in the update request matches the display status, in the display management information, corresponding to the identification information of the information processing terminal 14-2 (step S385).

Here, the display status included in the update request is "shared display" but the display status, in the display management information, corresponding to the identification information of the information processing terminal 14-2 is "non-display". Therefore, the display statuses do not match each other. Accordingly, in this case, the determiner 12C returns the result of determination indicating that display is not allowed to the request processor 12B (step S386).

When receiving the result of determination indicating that display is not allowed from the determiner 12C, the request processor 12B of the display processing apparatus 12 transmits response information to the information processing terminal 14-2 (step S387). The response information includes the display status "non-display", an image size "0×0", and an update frequency "5 fps", in the display management information, corresponding to the identification information of the information processing terminal 14-2.

That is, in a case where the display controller 12J of the display processing apparatus 12 performs full-screen display, the request processor 12B of the display processing apparatus 12 transmits response information that includes the display status "non-display" to any information processing terminal 14 (the information processing terminal 14-2 in this case) having an established communication connection other than the information processing terminal 14-1, which is the transmission source of the image data 50 that is displayed in a full-screen mode.

The response information receiver 14C of the information processing terminal 14-2 receives the response information. Then, the update request transmitter 14F of the information processing terminal 14-2 transmits an update request that includes the display status "non-display", dummy data, and the identification information of the information processing terminal 14-2 to the display processing apparatus 12 (step S388). When receiving the update request, the request processor 12B of the display processing apparatus 12 calls the determiner 12C (step S389). When called, the determiner 12C of the display processing apparatus 12 accesses the display management information in the storage unit 12D (steps S390 and S391) and determines whether the display status included in the update request matches the display status, in the display management information, corresponding to the identification information of the information processing terminal 14-2 (step S392).

Here, the display status included in the update request is "non-display" and matches the display status, which is "non-display", in the display management information, corresponding to the identification information of the information processing terminal 14-2. Accordingly, in this case, the determiner 12C returns the result of determination indicating that display is allowed to the request processor 12B (step S393).

When receiving the result of determination indicating that display is allowed from the determiner 12C, the request processor 12B of the display processing apparatus 12 feeds the dummy data included in the update request received in step S388 to the output unit 12E (step S394). The storage controller 12H of the output unit 12E stores predetermined information included in the received dummy data in the storage unit 12D in association with the identification information of the information processing terminal 14-1, which is the transmission source of the image data 50 that is being displayed by the display controller 12J, and the scene of the image data (step S395). Note that the update request received in step S388 does not include image data, and therefore, the display controller 12J does not update the image data 50. Thereafter, the sequence ends.

Figure 13:
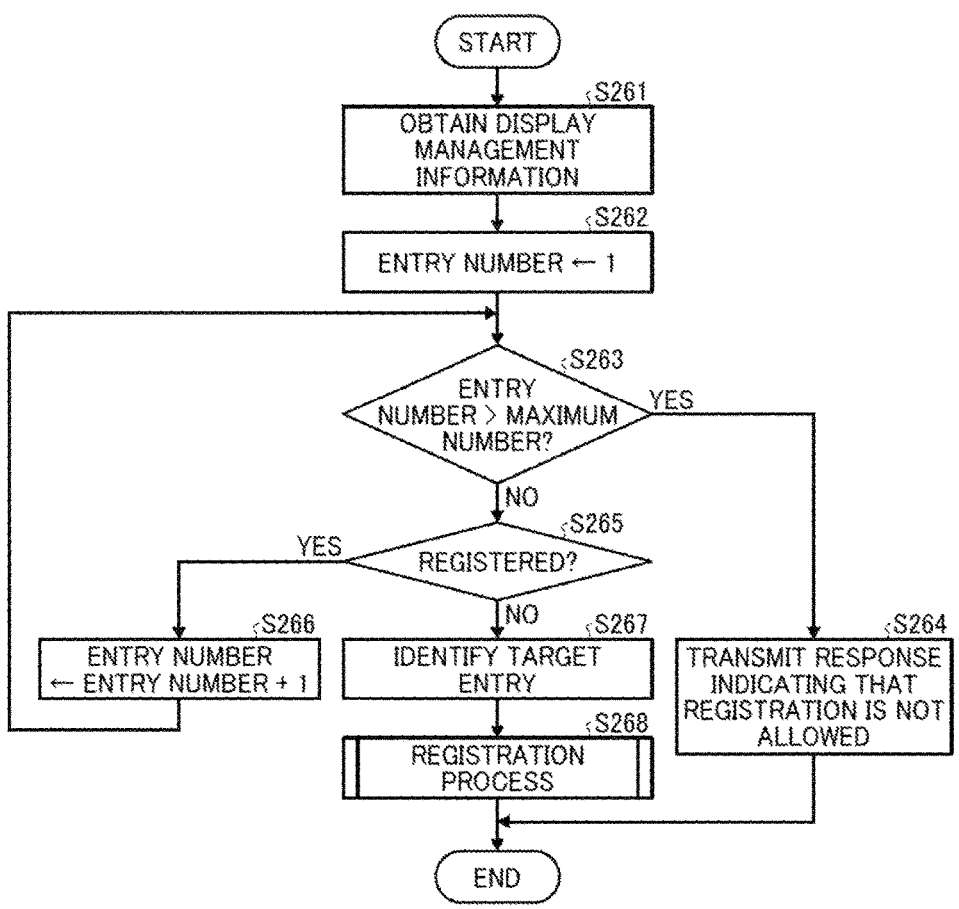
FIG. 13 is a flowchart illustrating an exemplary procedure of information processing performed by the display processing apparatus.

Now, the procedure of information processing performed by the display processing apparatus 12 when the display processing apparatus 12 receives a reservation request from one of the information processing terminals 14 is described. FIG. 13 is a flowchart illustrating an exemplary procedure of information processing performed by the display processing apparatus 12 when the display processing apparatus 12 receives a reservation request from one of the information processing terminals 14.

In a case of receiving a reservation request, the request processor 12B of the display processing apparatus 12 first obtains display management information from the storage unit 12D (step S261). Next, the request processor 12B sets "1" as the entry number (step S262). Subsequently, the request processor 12B determines whether the entry number exceeds the maximum number (step S263). The maximum number is the number of the information processing terminals 14 that can simultaneously establish a communication connection with the display processing apparatus 12. In other words, the maximum number is the maximum number of pieces of image data 50 that are put together on one screen. The maximum number is four, for example. If the entry number exceeds the maximum number (Yes in step S263), the request processor 12B transmits response information indicating that registration is not allowed to the information processing terminal 14 that is the transmission source of the reservation request (step S264), and the flow ends.

If the entry number does not exceed the maximum number (No in step S263), the request processor 12B determines whether identification information of one of the information processing terminals 14 is registered in an entry having the entry number (step S265). That is, the request processor 12B determines whether the entry having the entry number is empty. If identification information of one of the information processing terminals 14 is registered in the entry having the entry number (Yes in step S265), the request processor 12B increments the entry number by one (step S266), and the flow returns to step S263.

As a result of determination in step S265, if it is determined that identification information of one of the information processing terminals 14 is not registered in the entry having the entry number, that is, if the entry having the entry number is empty (No in step S265), the flow proceeds to step S267. In step S267, the request processor 12B identifies the entry having the entry number as a target entry (step S267). Subsequently, the request processor 12B performs a registration process illustrated in FIG. 14 for the identified target entry (step S268). Thereafter, this routine ends.

Figure 14:
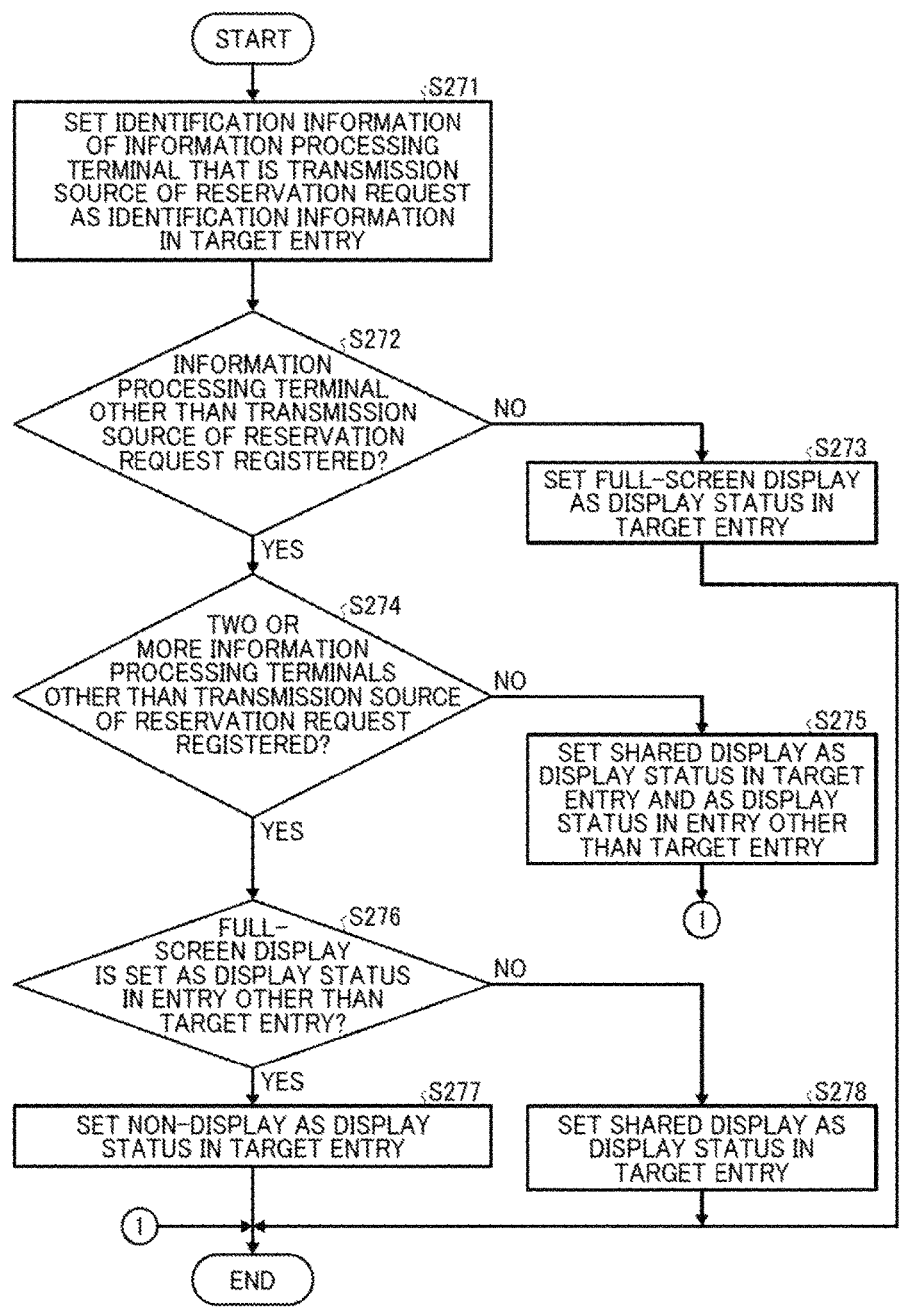
FIG. 14 is a flowchart illustrating an exemplary operation of registering.

FIG. 14 is a flowchart illustrating an exemplary procedure of the registration process (step S268 in FIG. 13). In step S268 in FIG. 13, the request processor 12B performs the process illustrated in FIG. 14.

First, the request processor 12B sets identification information of the information processing terminal 14 that is the transmission source of the reservation request as the identification information in the target entry in the display management information (step S271). Next, the request processor 12B determines whether identification information of the information processing terminal 14 other than the transmission source of the reservation request is registered in an entry other than the target entry in the display management information (step S272). If identification information of the information processing terminal 14 other than the transmission source of the reservation request is not registered in an entry other than the target entry (No in step S272), the flow proceeds to step S273.

In step S273, the request processor 12B sets "full-screen display" as the display status in the target entry in the display management information (step S273). Further, in step S273, the request processor 12B sets the image size and the update frequency in the target entry to values corresponding to the display status "full-screen display". Thereafter, this routine ends.

On the other hand, if identification information of the information processing terminal 14 other than the transmission source of the reservation request is registered in an entry other than the target entry (Yes in step S272), the flow proceeds to step S274.

In step S274, the request processor 12B determines whether two or more pieces of identification information of two or more information processing terminals 14 other than the transmission source of the reservation request are registered in the display management information (step S274). If two or more pieces of identification information are not registered, that is, if only one piece of identification information of one information processing terminal 14 other than the transmission source of the reservation request is registered in the display management information (No in step S274), the flow proceeds to step S275.

In step S275, the request processor 12B sets "shared display" as the display status in the target entry and as the display status in the entry other than the target entry (step S275). Thereafter, this routine ends.

On the other hand, if it is determined that two or more pieces of identification information are registered as a result of determination in step S274 (Yes in step S274), the flow proceeds to step S276.

In step S276, the request processor 12B determines whether "full-screen display" is set as the display status in an entry other than the target entry in the display management information (step S276). If "full-screen display" is set (Yes in step S276), the flow proceeds to step S277.

In step S277, the request processor 12B sets "non-display" as the display status in the target entry (step S277). Thereafter, this routine ends.

On the other hand, if it is determined that "full-screen display" is not set as a result of determination in step S276 (No in step S276), the flow proceeds to step S278. In step S278, the request processor 12B sets "shared display" as the display status in the target entry in the display management information (step S278). Thereafter, this routine ends.

Figure 15:
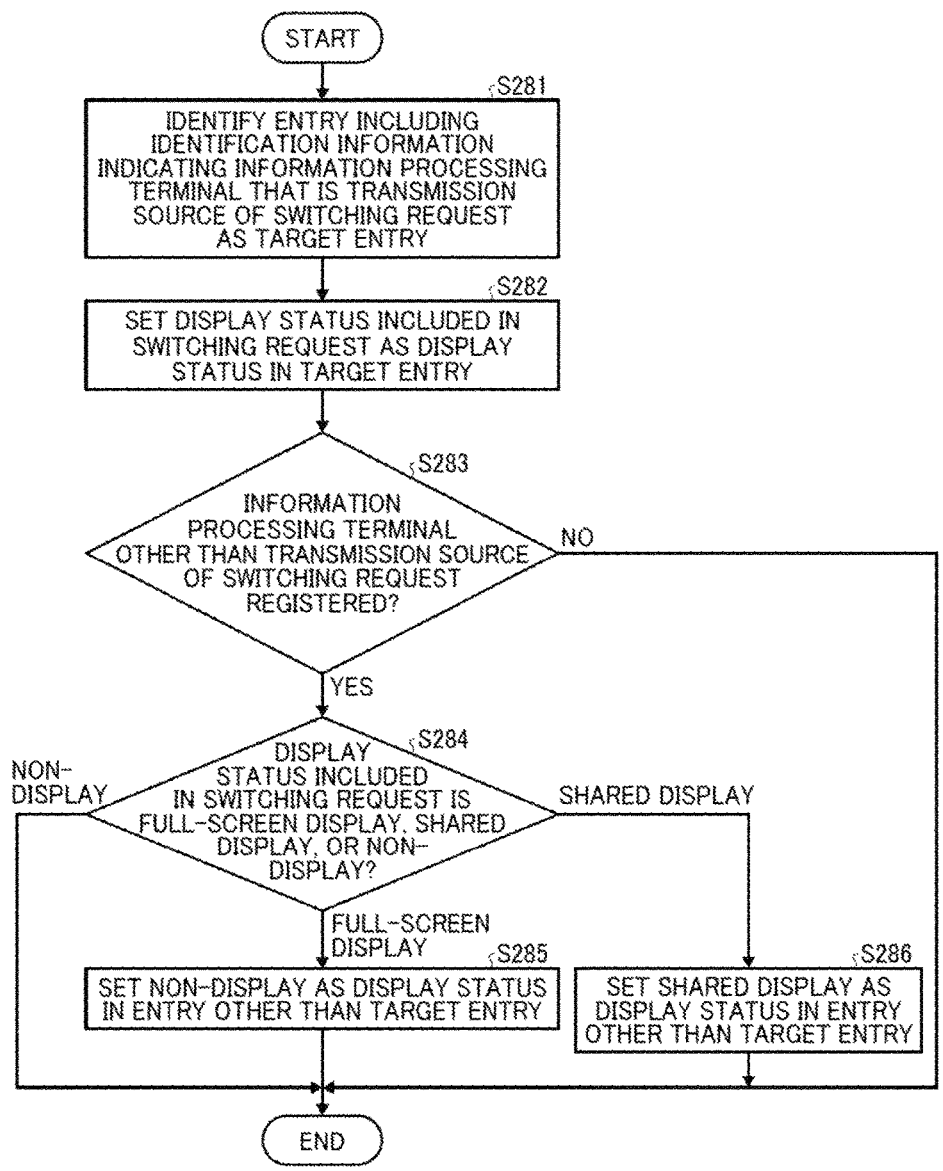
FIG. 15 is a flowchart illustrating an exemplary operation of processing information.

Now, an exemplary procedure of information processing performed in a case where the display processing apparatus 12 receives a switching request is described. FIG. 15 is a flowchart illustrating an exemplary procedure of information processing performed in a case where the display processing apparatus 12 receives a switching request.

First, the switching processor 12A of the display processing apparatus 12 identifies an entry that includes identification information indicating the information processing terminal 14 that is the transmission source of the switching request as a target entry (step S281). Next, the switching processor 12A sets a display status included in the received switching request as the display status in the target entry (step S282). Further, in step S282, the switching processor 12A sets the image size and the update frequency in the target entry to values corresponding to the display status included in the switching request.

Subsequently, the switching processor 12A determines whether identification information of the information processing terminal 14 other than the transmission source of the switching request is registered in an entry other than the target entry (step S283). If identification information of the information processing terminal 14 other than the transmission source of the switching request is not registered in an entry other than the target entry (No in step S283), this routine ends.

On the other hand, if identification information of the information processing terminal 14 other than the transmission source of the switching request is registered in an entry other than the target entry (Yes in step S283), the flow proceeds to step S284.

In step S284, the switching processor 12A determines whether the display status included in the switching request is "fill-screen display", "shared display", or "non-display" (step S284). If the display status included in the switching request is "full-screen display" (full-screen display in step S284), the flow proceeds to step S285.

In step S285, the switching processor 12A sets "non-display" as the display status in any entry other than the target entry in the display management information (step S285). Further, in step S285, the switching processor 12A sets the image size and the update frequency in any entry other than the target entry in the display management information to values corresponding to the display status "non-display". Thereafter, this routine ends.

On the other hand, if it is determined that the display status is "non-display" as a result of determination in step S284 (non-display in step S284), this routine ends.

If it is determined that the display status is "shared display" as a result of determination in step S284 (shared display in step S284), the flow proceeds to step S286. In step S286, the switching processor 12A sets "shared display" as the display status in any entry other than the target entry (step S286). Further, in step S286, the switching processor 12A sets the image size and the update frequency in any entry other than the target entry to values corresponding to the display status "shared display". Thereafter, this routine ends.

Figure 16:
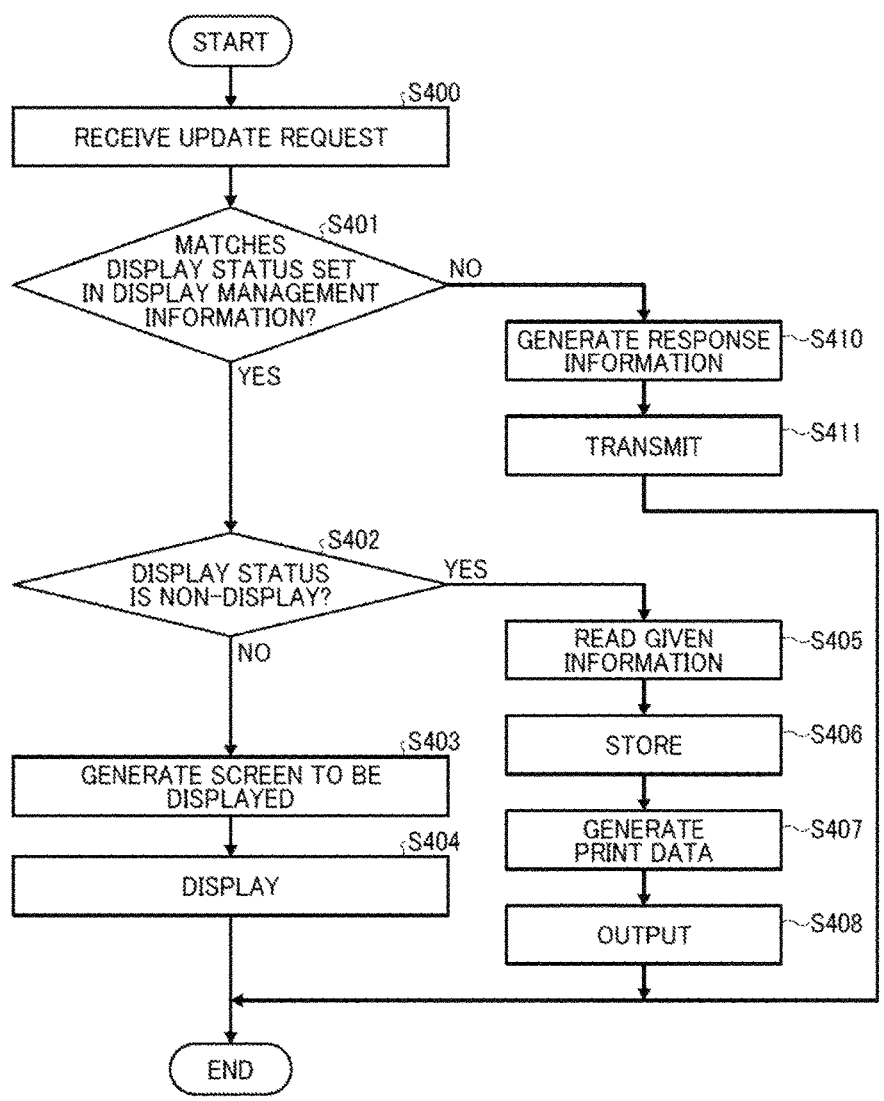
FIG. 16 is a flowchart illustrating an exemplary operation of processing information.

Now, an exemplary procedure of information processing performed by the display processing apparatus 12 when the display processing apparatus 12 receives an update request from one of the information processing terminals 14 is described. FIG. 16 is a flowchart illustrating an exemplary procedure of information processing performed by the display processing apparatus 12 when the display processing apparatus 12 receives an update request.

First, the request processor 12B of the display processing apparatus 12 receives an update request from one of the information processing terminals 14 (step S400). Next, the determiner 12C determines whether a display status included in the update request received in step S400 matches the display status, in the display management information, corresponding to identification information included in the update request (step S401).

If it is determined that the display statuses match each other (Yes in step S401), the flow proceeds to step S402. In step S402, the request processor 12B determines whether the display status included in the update request received in step S400 is "non-display" (step S402).

If it is determined in step S402 that the display status is "full-screen display" or "shared display" (No in step S402), the flow proceeds to step S403. In step S403, the drawer 12I generates the display area 17 to be displayed (step S403). The display controller 12J projects (displays) the display area 17 generated by the drawer 12I onto the screen 16 (step S404).

Specifically, if it is determined in step S402 that the display status is "full-screen display", the drawer 12I arranges the image data 50 included in the update request received in step S400 on the display area 17 in the process in step S403. The display controller 12J projects the display area 17 onto the screen 16. Accordingly, the display controller 12J displays the image data 50 in a full-screen mode.

If it is determined in step S402 that the display status is "shared display", the drawer 12I puts together and arranges the image data 50 included in the update request received in step S400 and the image data 50 corresponding to identification information of any other information processing terminal 14 included in the display management information on the display area 17 in the process in step S403. The display controller 12J projects the display area 17 onto the screen 16. Accordingly, the display controller 12J displays the plurality of pieces of image data 50 in a shared manner. Thereafter, this routine ends.

On the other hand, if it is determined in step S402 that the display status is "non-display" (Yes in step S402), the flow proceeds to step S405.

In step S405, the storage controller 12H reads predetermined information from dummy data included in the update request received in step S400 (step S405). The storage controller 12H stores the predetermined information read in step S405 in the storage unit 12D (step S406). At this time, the storage controller 12H stores the predetermined information in the storage unit 12D in association with the image data 50 that is projected (displayed) onto the screen 16 (display unit) at the time of reception of the update request including the predetermined information, the identification information of the information processing terminal 14 that is the transmission source of the update request, and scene identification information for identifying the scene of the image data 50, as described above.

Subsequently, the print data generator 12F generates print data (step S407). The print data generator 12F generates the print data 52 that includes the predetermined information and the image data corresponding to the predetermined information stored in the storage unit 12D (or in the information storage device 13). The print data generator 12F outputs the generated print data 52 to an image forming apparatus (step S408). Thereafter, this routine ends.

The timing at which the process in step S407 is performed and the timing at which the process in step S408 is performed are not limited to those as illustrated in FIG. 16.

On the other hand, if it is determined that the display statuses do not match each other as a result of determination in step S401 (No in step S401), the flow proceeds to step S410. In step S410, the request processor 12B generates response information that includes the display status, the image size, and the update frequency, in the display management information, corresponding to the identification information included in the update request received in step S400 (step S410). Then, the request processor 12B transmits the response information generated in step S410 to the information processing terminal 14 that is the transmission source of the update request received in step S400 (step S411). Thereafter, this routine ends.

As described above, the information processing system 10 according to an embodiment of the present invention includes the plurality of information processing terminals 14 and the display processing apparatus 12, which communicates with the plurality of information processing terminals 14. The display processing apparatus 12 includes the switching processor 12A (switching request receiver), the display controller 12J, and the request processor 12B (response information transmitter and update request receiver).

The switching processor 12A receives a full-screen switching request for switching from shared display in which a plurality of pieces of image data 50 are collectively displayed on one screen, which is the display area 17, on the screen 16 to full-screen display in which only one piece of image data 50 is displayed on one screen, which is the display area 17, on the screen 16. In the case of receiving the full-screen switching request, the display controller 12J displays the image data 50 received from one information processing terminal 14 on the screen 16 (display unit) in a full-screen mode. In the case of full-screen display by the display controller 12J, the request processor 12B (response information transmitter) transmits response information that includes non-display information (display status "non-display") indicating non-display of the image data 50 to any information processing terminal 14 having an established communication connection other than the information processing terminal 14 that is the transmission source of the image data 50 that is displayed in a full-screen mode. The request processor 12B (update request receiver) receives an update request that does not include image data to be displayed and includes predetermined information having a data amount smaller than the data amount of the image data from the information processing terminal 14 that is the transmission destination of the response information including the non-display information.

Each of the information processing terminals 14 includes the response information receiver 14C and the update request transmitter 14F. The response information receiver 14C receives response information. In the case where the response information includes non-display information (display status "non-display"), the update request transmitter 14F transmits an update request that does not include image data to be displayed and includes predetermined information to the display processing apparatus 12.

Accordingly, in the information processing system 10 according to an embodiment of the present invention, at the time of switching from shared display to full-screen display, established communication connections of the information processing terminals 14 other than the information processing terminal 14 that is the transmission source of the image data 50 that is displayed in a full-screen mode are maintained, and response information is transmitted to the other information processing terminals 14.

With the related art, in a case of switching from a state in which a plurality of pieces of image data are collectively displayed on a screen to a state in which only one piece of image data is displayed on the screen, communication connections between the information processing terminals 14 that transmit image data that is not displayed on the screen and the display processing apparatus 12 are disconnected. Therefore, in a case of resuming the state in which a plurality of pieces of image data are collectively displayed on the screen, a communication connection with each of the plurality of information processing terminals 14 needs to be reestablished.

In the information processing system 10 according to the present embodiment, at the time of switching from shared display to full-screen display, established communication connections of the information processing terminals 14 other than the information processing terminal 14 that is the transmission source of the image data 50 that is displayed in a full-screen mode are maintained, and response information is transmitted to the other information processing terminals 14.

Therefore, in the information processing system 10 according to an embodiment of the present invention, a communication procedure that is performed at the time of switching of the display state need not be performed.

Accordingly, in the information processing system 10 according to an embodiment of the present invention, a processing load of a procedure for communication connections between the display processing apparatus 12 and the information processing terminals 14 can be reduced.

Further, in the information processing system 10 according to an embodiment of the present invention, in the case where response information includes non-display information (display status "non-display"), the information processing terminal 14 transmits an update request that does not include image data to be displayed and includes predetermined information to the display processing apparatus 12.

That is, the information processing terminal 14 transmits an update request that does not include image data in the case of the display status "non-display". Accordingly, in addition to the effects described above, in the information processing system 10 according to the present embodiment, a communication load between the display processing apparatus 12 and the information processing terminals 14 and a processing load of the information processing system 10 can be reduced.

Further, the information processing terminal 14 transmits an update request that includes predetermined information to the display processing apparatus 12. Therefore, the display processing apparatus 12 can receive data (predetermined information) relating to the image data 50 that is not displayed due to switching from shared display to full-screen display or relating to the image data 50 that is being displayed from the information processing terminal 14. Accordingly, in addition to the effects described above, in the information processing system 10 according to an embodiment of the present invention, predetermined information can be used for purposes other than maintaining connections between the display processing apparatus 12 and the information processing terminals 14.

In the case of receiving from the display processing apparatus 12 response information that includes a display status (for example, "full-screen display" or "shared display") other than the display status "non-display", the information processing terminal 14 may transmit an update request that includes predetermined information in addition to image data to be displayed to the display processing apparatus 12.

The display processing apparatus 12 includes the storage controller 12H, which stores predetermined information in the storage unit (storage unit 12D or information storage device 13).

The storage controller 12H of the display processing apparatus 12 stores predetermined information in the storage unit (storage unit 12D or information storage device 13) in association with identification information of the information processing terminal 14 that is the transmission source of the image data 50 that is displayed on the screen 16 (display unit) at the time of reception of an update request that includes the predetermined information.

Accordingly, in addition to the effects described above, the information processing system 10 according to an embodiment of the present invention can manage, in association with identification information of the information processing terminal 14 that is the transmission source of the image data 50 displayed by the display processing apparatus 12 in a full-screen mode, predetermined information, such as minutes or comments, received from any other information processing terminal 14.

The storage controller 12H of the display processing apparatus 12 stores predetermined information in the storage unit (storage unit 12D or information storage device 13) in association with terminal identification information, the image data 50 that is displayed on the screen 16 (display unit) at the time of reception of an update request that includes the predetermined information, and scene identification information for identifying the scene of the image data 50.

Accordingly, the information processing system 10 according to the present embodiment can manage, in association with the terminal identification information of the information processing terminal 14 that is the transmission source of the image data 50 displayed by the display processing apparatus 12 in a full-screen mode and for each scene, predetermined information, such as minutes or comments, received from any other information processing terminal 14. Accordingly, in addition to the effects described above, the information processing system 10 according to the present embodiment can easily manage predetermined information and the corresponding scene.

The display processing apparatus 12 includes the print data generator 12F, which generates the print data 52 that includes predetermined information and image data corresponding to the predetermined information stored in the storage unit (storage unit 12D or information storage device 13).

Accordingly, in addition to the effects described above, in the information processing system 10 according to the present embodiment, the print data 52 can be formed on a recording medium or the like to easily present the image data 50 displayed by the display processing apparatus 12 in a full-screen mode and predetermined information received while the image data 50 is being displayed in association with each other. For example, the information processing system 10 according to the present embodiment can present predetermined information received from one of the information processing terminals 14 for the displayed image data 50 so as to allow easy checking.

The switching processor 12A (switching request receiver) of the display processing apparatus 12 receives a full-screen switching request (a switching request that includes the display status "full-screen display") or a switching-to-sharing request (a switching request that includes the display status "shared display") for switching from full-screen display to shared display. In the case of receiving a switching-to-sharing request, the display controller 12J of the display processing apparatus 12 displays a plurality of pieces of image data 50 respectively received from the plurality of information processing terminals 14 each having an established communication connection on the display unit (screen 16) in a shared manner.

In the case where the display controller 12J performs shared display, the request processor 12B (response information transmitter) of the display processing apparatus 12 transmits, to each of the information processing terminals 14 that are the transmission sources of the plurality of pieces of image data 50 displayed in a shared manner, response information that includes shared-display information (display status "shared display") indicating shared display of the image data 50 and the image size of the image data 50 when the image data 50 is displayed in a shared manner. In the case of receiving response information that includes an image size and shared-display information, the update request transmitter 14F of the information processing terminal 14 transmits an update request that includes image data having a resolution that corresponds to the image size and the shared-display information to the display processing apparatus 12.

Accordingly, in the information processing system 10 according to an embodiment of the present invention, each of the information processing terminals 14 can transmit to the display processing apparatus 12 new image data having a resolution that corresponds to the display state of image data that has been transmitted from the information processing terminal 14. Accordingly, in addition to the effects described above, in the information processing system 10 according to the present embodiment, a communication load between the display processing apparatus 12 and the information processing terminals 14 and a processing load of the information processing system 10 can be reduced.

In the case where the display controller 12J performs shared display, the request processor 12B (response information transmitter) of the display processing apparatus 12 transmits, to each of the information processing terminals 14 that are the transmission sources of the plurality of pieces of image data 50 displayed in a shared manner, response information that includes shared-display information (display status "shared display") indicating shared display of the image data 50, the image size of the image data 50 when the image data 50 is displayed in a shared manner, and the update frequency of the image data 50. The update request transmitter 14F of each of the information processing terminals 14 transmits an update request to the display processing apparatus 12 at a transmission frequency corresponding to the update frequency included in the response information.

Accordingly, in the information processing system 10 according to the present embodiment, each of the information processing terminals 14 can transmit an update request to the display processing apparatus 12 at an update frequency corresponding to the display state of image data that has been transmitted from the information processing terminal 14. Accordingly, in addition to the effects described above, in the information processing system according to the present embodiment, a communication load between the display processing apparatus 12 and the information processing terminals 14 and a processing load of the information processing system 10 can be reduced.

A display processing method according to the present embodiment includes; receiving a full-screen switching request for switching from shared display in which a plurality of pieces of image data 50 are collectively displayed on one screen, which is the display area 17, to full-screen display in which only one piece of image data 50 is displayed on one screen, which is the display area 17; displaying, in a case of receiving the full-screen switching request, a piece of image data 50 received from one information processing terminal 14 among a plurality of information processing terminals 14 each having an established communication connection on the display unit (screen 16) in a full-screen mode; transmitting, in a case of full-screen display, to any information processing terminal 14 having an established communication connection other than the information processing terminal 14 that is the transmission source of the piece of image data 50 displayed in a full-screen mode, response information that includes non-display information indicating non-display of the image data 50; and receiving from the information processing terminal 14 that is the transmission destination of the response information including the non-display information an update request that does not include image data to be displayed and includes predetermined information having a data amount smaller than the data amount of the image data.

A non-transitory recording medium according to the present embodiment is a non-transitory recording medium storing a display program for causing a computer to perform a process including: receiving a full-screen switching request for switching from shared display in which a plurality of pieces of image data 50 are collectively displayed on one screen, which is the display area 17, to full-screen display in which only one piece of image data 50 is displayed on one screen, which is the display area 17; displaying, in a case of receiving the full-screen switching request, a piece of image data 50 received from one information processing terminal 14 among a plurality of information processing terminals 14 each having an established communication connection on the display unit (screen 16) in a full-screen mode; transmitting, in a case of full-screen display, to any information processing terminal 14 having an established communication connection other than the information processing terminal 14 that is the transmission source of the piece of image data 50 displayed in a full-screen mode, response information that includes non-display information indicating non-display of the image data 50; and receiving from the information processing terminal 14 that is the transmission destination of the response information including the non-display information an update request that does not include image data to be displayed and includes predetermined information having a data amount smaller than the data amount of the image data.

The above-described embodiment describes the exemplary case where the display processing apparatus 12 projects the image data 50 onto the screen 16; however, the display processing apparatus 12 may have a configuration that includes a display unit, such as a display.

FIG. 17 is a block diagram illustrating an exemplary functional configuration of the information processing terminal 14 and a display processing apparatus 15 according to this modification.

The information processing terminal 14 is the same as in the above-described embodiment. The display processing apparatus 15 includes the switching processor 12A, the request processor 12B, the determiner 12C, the storage unit 12D, the output unit 12E, and the print data generator 12F as in the display processing apparatus 12 according to the above-described embodiment. The information processing terminal 14 includes the switching request transmitter 14A, the reservation request transmitter 14B, the response information receiver 14C, the response information storage unit 14D, the image data generator 14E, and the update request transmitter 14F. The display processing apparatus 15 further includes a display unit 15K.

The display unit 15K is a display for displaying various images. In this modification, the display controller 12J displays the image data 50 (display area 17) on the display unit 15K instead of the screen 16. Except for this, the display processing apparatus 15 is similar to the display processing apparatus 12.

As described above, the display processing apparatus 15 may include the display unit 15K. The display processing apparatus 15 according to this modification has the same configuration as that of the display processing apparatus 12 according to the above-described embodiment except for the further included display unit 15K. Accordingly, the display processing apparatus 15 can produce effects similar to those produced by the above-described embodiment.

A program executed by the display processing apparatus 12, the display processing apparatus 15, and the information processing terminals 14 is recorded to a computer-readable recording medium, such as a compact disc read-only memory (CD-ROM), a floppy disk (FD), a compact disk recordable (CD-R), or a digital versatile disk (DVD), as an installable file or an executable file and provided.

The program executed by the display processing apparatus 12, the display processing apparatus 15, and the information processing terminals 14 may be stored on a computer connected to a network, such as the Internet, downloaded over the network, and provided. The program executed by the display processing apparatus 12, the display processing apparatus 15, and the information processing terminals 14 may be provided or distributed over a network, such as the Internet. The program executed by the display processing apparatus 12, the display processing apparatus 15, and the information processing terminals 14 may be stored in advance in a ROM and provided.

The program executed by the display processing apparatus 12, the display processing apparatus 15, and the information processing terminals 14 for performing the above-described processes has a module configuration that includes the above-described units. In terms of the actual hardware operation, when a CPU reads the program from a recording medium and executes the program, the units are loaded to a main memory and configured in the main memory.

Note that various types of information stored in the storage unit of the display processing apparatus 12, that of the display processing apparatus 15, and that of each of the information processing terminals 14 may be stored in an external device. In this case, the external device is connected to the display processing apparatus 12, the display processing apparatus 15, and the information processing terminals 14 over a network, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
a plurality of information processing terminals; and
a display processing apparatus to establish a communication with each of the plurality of information processing terminals through a network,
the display processing apparatus including:
  a first receiver to receive a switching request for switching from a shared-display mode in which a plurality of pieces of image data are collectively displayed on one screen to a full-screen display mode in which one piece of image data is displayed on one screen;
  circuitry to display first image data received from a first information processing terminal of the plurality of information processing terminals on a display in the full-screen display mode in response to receiving the switching request for switching to the full-screen display mode;
  a first transmitter to transmit first response information that includes non-display information indicating non-display of image data to a second information processing terminal of the plurality of information processing terminals in the full-screen display mode, the second information processing terminal being one or more information processing terminals other than the first information processing terminal; and
  a second receiver to receive an update request from the second information processing terminal in response to the second information processing terminal receiving the first response information including the non-display information, the update request not including second image data to be transmitted from the second information processing terminal and including predetermined information having a data amount smaller than a data amount of the second image data,
the second information processing terminal including:
  a third receiver to receive the first response information including the non-display information from the display processing apparatus; and
  a second transmitter to transmit the update request to the display processing apparatus in response to receiving the first response information including the non-display information,
wherein the first receiver of the display processing apparatus further receives a switching request for switching from the full-screen display mode to the shared-display mode,
the circuitry of the display processing apparatus displays a plurality of pieces of image data respectively received from the plurality of information processing terminals each having the established communication, on the display in the shared-display mode in response to receiving the switching request for switching to the shared-display mode,
the first transmitter of the display processing apparatus transmits second response information that includes shared-display information indicating display of image data in the shared-display mode, an image size of the image data when the image data is displayed in the shared-display mode, and an update frequency of the image data to each of the information processing terminals that are transmission sources of the plurality of pieces of image data displayed in the shared-display mode, in the shared-display mode, and
the second transmitter of the second information processing terminal transmits another update request to the display processing apparatus at a transmission frequency that corresponds to the update frequency included in the second response information.

2. The information processing system according to claim 1, wherein the circuitry of the display processing apparatus stores the predetermined information in a memory.

3. The information processing system according to claim 2, wherein
the circuitry of the display processing apparatus stores the predetermined information in association with terminal identification information of the first information processing terminal, and
the first image data received from the first information processing terminal is being displayed on the display when the update request including the predetermined information is received.

4. The information processing system according to claim 3, wherein the circuitry of the display processing apparatus stores the predetermined information in the memory in association with the terminal identification information of the first information processing terminal, the first image data displayed on the display, and scene identification information for identifying a scene of the first image data.

5. The information processing system according to claim 3, wherein the circuitry of the display processing apparatus further generates print data that includes the predetermined information and image data corresponding to the predetermined information stored in the memory.

6. The information processing system according to claim 1, wherein
said another update request transmitted to the display processing apparatus by the second transmitter of the second information processing terminal includes image data having a resolution that corresponds to the image size included in the second response information and the shared-display information included in the second response information, said another update request being transmitted in response to receiving the second response information including the image size and the shared-display information.

7. A display processing apparatus connected to a plurality of information processing terminals through a network, the apparatus comprising:
a first receiver to receive a switching request for switching from a shared-display mode in which a plurality of pieces of image data are collectively displayed on one screen to a full-screen display mode in which one piece of image data is displayed on one screen;
circuitry to display first image data received from the first information processing terminal of the plurality of information processing tellninals on a display in the full-screen display mode in response to receiving the switching request for switching to the full-screen display mode;
a transmitter to transmit first response information that includes non-display information indicating non-display of image data to a second information processing terminal of the plurality of information processing terminals in the full-screen display mode, the second information processing terminal being one or more information processing terminals other than the first information processing terminal; and
a second receiver to receive an update request from the second information processing terminal in response to the second information processing terminal receiving the first response information including the non-display information, the update request not including second image data to be transmitted from the second information processing terminal and including predetermined information having a data amount smaller than a data amount of the second image data,
wherein the first receiver of the display processing apparatus further receives a switching request for switching from the full-screen display mode to the shared-display mode,
the circuitry of the display processing apparatus displays a plurality of pieces of image data respectively received from the plurality of information processing terminals each having the established communication, on the display in the shared-display mode in response to receiving the switching request for switching to the shared-display mode,
the transmitter of the display processing apparatus transmits second response information that includes shared-display information indicating display of image data in the shared-display mode, an image size of the image data when the image data is displayed in the shared-display mode, and an update frequency of the image data to each of the information processing terminals that are transmission sources of the plurality of pieces of image data displayed in the shared-display mode, in the shared-display mode, and
the display processing apparatus receives another update request transmitted by the second information processing terminal at a transmission frequency that corresponds to the update frequency included in the second response information.

8. The display processing apparatus according to claim 7, wherein
the circuitry of the display processing apparatus stores in a memory the predetermined information in association with terminal identification information of the first infouiiation processing terminal, and
the first image data received from the first information processing terminal is displayed on the display when the update request including the predetermined information is received.

9. The display processing apparatus according to claim 8, wherein the circuitry of the display processing apparatus stores the predetermined information in the memory in association with the terminal identification information of the first information processing terminal, the first image data displayed on the display, and scene identification information for identifying a scene of the first image data.

10. The display processing apparatus according to claim 8, wherein the circuitry of the display processing apparatus further generates print data that includes the predetermined information and image data corresponding to the predetermined information stored in the memory.

11. The display processing apparatus according to claim 7, wherein
said another update request received by the display processing apparatus from the second information processing terminal includes image data having a resolution that corresponds to the image size included in the second response information and the shared-display information included in the second response information, and said another update request is transmitted by the second information processing terminal in response to the second information processing terminal receiving the second response information including the image size and the shared-display information.

12. A display processing method performed by a display processing apparatus connected to a plurality of information processing terminals through a network, the method comprising:

receiving a switching request for switching from a shared-display mode in which a plurality of pieces of image data are collectively displayed on one screen to a full-screen display mode in which one piece of image data is displayed on one screen;

displaying first image data received from a first information processing terminal of the plurality of information processing terminals on a display in the full-screen display mode in response to receiving the switching request for switching to the full-screen display mode;

transmitting first response information that includes non-display information indicating non-display of image data to a second information processing terminal of the plurality of information processing terminals in the full-screen display mode, the second information processing terminal being one or more information processing terminals other than the first information processing terminal;

receiving an update request from the second information processing terminal in response to the second information processing terminal receiving the first response information, the update request not including second image data to be transmitted from the second information processing terminal and including predetermined information having a data amount smaller than a data amount of the second image data;

receiving a switching request for switching from the full-screen display mode to the shared-display mode;

displaying a plurality of pieces of image data respectively received from the plurality of information processing terminals each having the established communication, on the display in the shared-display mode in response to receiving the switching request for switching to the shared-display mode;

transmitting second response information that includes shared-display information indicating display of image data in the shared-display mode, an image size of the image data when the image data is displayed in the shared-display mode, and an update frequency of the image data to each of the information processing terminals that are transmission sources of the plurality of pieces of image data displayed in the shared-display mode, in the shared-display mode; and receiving another update request transmitted by the second information processing terminal at a transmission frequency that corresponds to the update frequency included in the second response information.

13. The display processing method according to claim 12, further comprising:

storing in a memory the predetelmined information in association with terminal identification information of the first information processing terminal, wherein the first image data received from the first information processing terminal is displayed on the display when the update request including the predetermined information is received.

14. The display processing method according to claim 13, wherein the predetermined information is stored in the memory in association with the terminal identification information of the first information processing terminal, the first image data displayed on the display, and scene identification information for identifying a scene of the first image data.

15. The display processing method according to claim 13, further comprising:

generating print data that includes the predetermined information and image data corresponding to the predetermined information stored in the memory.

16. The display processing method according to claim 12, wherein said another update request received by the display processing apparatus from the second information processing terminal includes image data having a resolution that corresponds to the image size included in the second response information and the shared-display information included in the second response information, said another update request is transmitted by the second information processing terminal in response to the second information processing terminal receiving the second response information including the image size and the shared-display information.

* * * * *